(12) United States Patent
Maeda

(10) Patent No.: US 7,742,095 B2
(45) Date of Patent: Jun. 22, 2010

(54) INFORMATION PROCESSING APPARATUS, METHOD AND STORAGE MEDIUM

(75) Inventor: Satomi Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 11/128,972

(22) Filed: May 13, 2005

(65) Prior Publication Data

US 2005/0253949 A1   Nov. 17, 2005

(30) Foreign Application Priority Data

May 14, 2004   (JP)   ............................. 2004-145491
May 6, 2005    (JP)   ............................. 2005-135425

(51) Int. Cl.
  *H04N 5/225*   (2006.01)
(52) U.S. Cl. ............................. 348/333.12; 348/333.05
(58) Field of Classification Search ............ 348/240.2, 348/333.01, 240.99, 169, 340, 333.05, 333.11, 348/333.12; 345/661; 707/104.1
  See application file for complete search history.

(56) References Cited

U.S. PATENT DOCUMENTS

| | | | |
|---|---|---|---|
| 5,801,953 A * | 9/1998 | Thoma et al. | 702/68 |
| 6,476,873 B1 * | 11/2002 | Maeng | 348/561 |
| 6,850,689 B1 * | 2/2005 | Ozawa et al. | 386/46 |
| 7,050,102 B1 * | 5/2006 | Vincent | 348/333.02 |
| 7,154,544 B2 * | 12/2006 | Kowno et al. | 348/240.99 |
| 7,227,557 B2 * | 6/2007 | Nakajima | 345/629 |
| 2003/0174220 A1 * | 9/2003 | Ito | 348/240.2 |
| 2004/0223731 A1 * | 11/2004 | Ozawa et al. | 386/46 |

FOREIGN PATENT DOCUMENTS

| | | |
|---|---|---|
| JP | 06-282258 | 10/1994 |
| JP | 08-202856 | 8/1996 |
| JP | 09-026769 | 1/1997 |
| JP | 11-282454 | 10/1999 |
| JP | 2001-324947 | 11/2001 |

\* cited by examiner

*Primary Examiner*—Tuan Ho
(74) *Attorney, Agent, or Firm*—Cowan, Liebowitz & Latman, P.C.

(57) ABSTRACT

Provided is a display technique whereby it is possible for an area, which an operator desires to zoom and display, to be zoomed and displayed in conformity with the size of the screen through a simple operation. This is achieved by an information processing apparatus capable of displaying any desired area, which has been designated in an image (801) displayed on a screen, upon enlarging the size of the area, the apparatus including: partitioning unit (step S1303) configured to partition the image into a plurality of areas based upon a given command; identifying unit (step S1304) configured to identify each area of the partitioned image; storage control unit (step S1304) configured to store results of the identification in storage means in association with the information concerning user operation; and pointer moving unit (step S1311) configured to successively move a pointer that is for designating each area. An area (any of blocks 0 to 6), which has been designated by the pointer, is enlarged and displayed in conformity with the size of the screen (step S1310).

5 Claims, 16 Drawing Sheets

FIG. 5

DELIMITATION LINE TABLE 501

| ID | STARTING-POINT COORDINATES | END-POINT COORDINATES |
|---|---|---|
| 0 | (X0, Y0) | (Xw, Yh) |
| 1 | (X1, Y1) | (X1, Y2) |
| 2 | (X2, Y3) | (X3, Y3) |
| 3 | (X2, Y4) | (X4, Y4) |
| ⋮ | ⋮ | ⋮ |
| n | ⋮ | ⋮ |

BLOCK TABLE 502

| ID | BLOCK COORDINATES |
|---|---|
| 0 | (X0, Y0)(Xw, Yh) |
| 1 | (X0, Y0)(X1, Y3) |
| 2 | (X2, Y3)(X1, Y4) |
| 3 | (X2, Y4)(X1, Y4) |
| 4 | (X1, Y1)(X3, Y3) |
| 5 | (X1, Y3)(X1, Y4) |
| 6 | (X1, Y4)(X3, YH) |
| ⋮ | ⋮ |
| 2n | ⋮ |

BLOCK TABLE 503

| ID | BLOCK COORDINATES |
|---|---|
| 0 | (0, 0)(Xw, Yh) |
| 1 | (X1, Y1)(X1w, Y1h) |
| 2 | (X2, Y2)(X2w, Y2h) |
| 3 | (X3, Y3)(X3w, Y3h) |
| 4 | (X4, Y4)(X4w, Y4h) |
| 5 | (X5, Y5)(X5w, Y5h) |
| 6 | (X6, Y6)(X6w, Y6h) |

FIG. 6

DELIMITATION LINE TABLE 601

| ID | STARTING-POINT COORDINATES | END-POINT COORDINATES |
|---|---|---|
| 0 | (0, 0) | (639, 479) |
| 1 | (300, 0) | (300, 479) |
| 2 | (0, 120) | (479, 120) |
| 3 | (0, 240) | (479, 240) |

BLOCK TABLE 602

| ID | BLOCK COORDINATES |
|---|---|
| 0 | (0, 0)(639, 479) |
| 1 | (0, 0)(300, 120) |
| 2 | (0, 120)(300, 240) |
| 3 | (0, 240)(300, 240) |
| 4 | (300, 0)(639, 120) |
| 5 | (300, 120)(639, 240) |
| 6 | (300, 240)(639, 479) |

F I G. 7
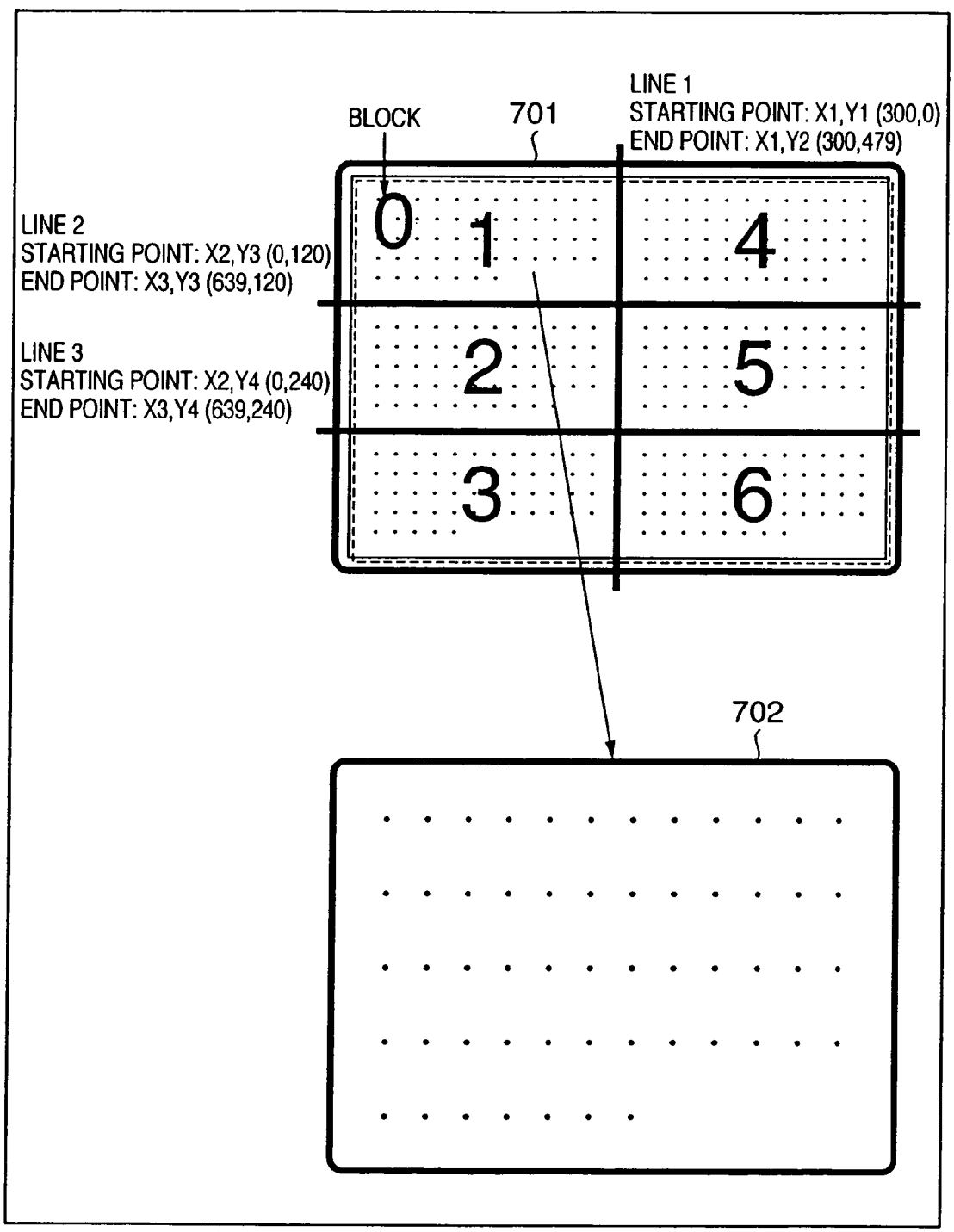

FIG. 15

DELIMITATION LINE TABLE 1501

| ID | STARTING-POINT COORDINATES | END-POINT COORDINATES |
|---|---|---|
| 0 | (0,0) | (639,479) |
| 1 | (0,0) | (330,250) |

BLOCK TABLE 1502

| ID | BLOCK COORDINATES | NON-DISPLAY |
|---|---|---|
| 0 | (0,0)(639,479) | 0 |
| 1 | (0,0)(330,250) | 0 |
| 2 | (300,0)(639,250) | 0 |
| 3 | (0,250)(290,479) | 0 |
| 4 | (300,250)(600,479) | 0 |
| 5 | (340,250)(639,479) | 0 |

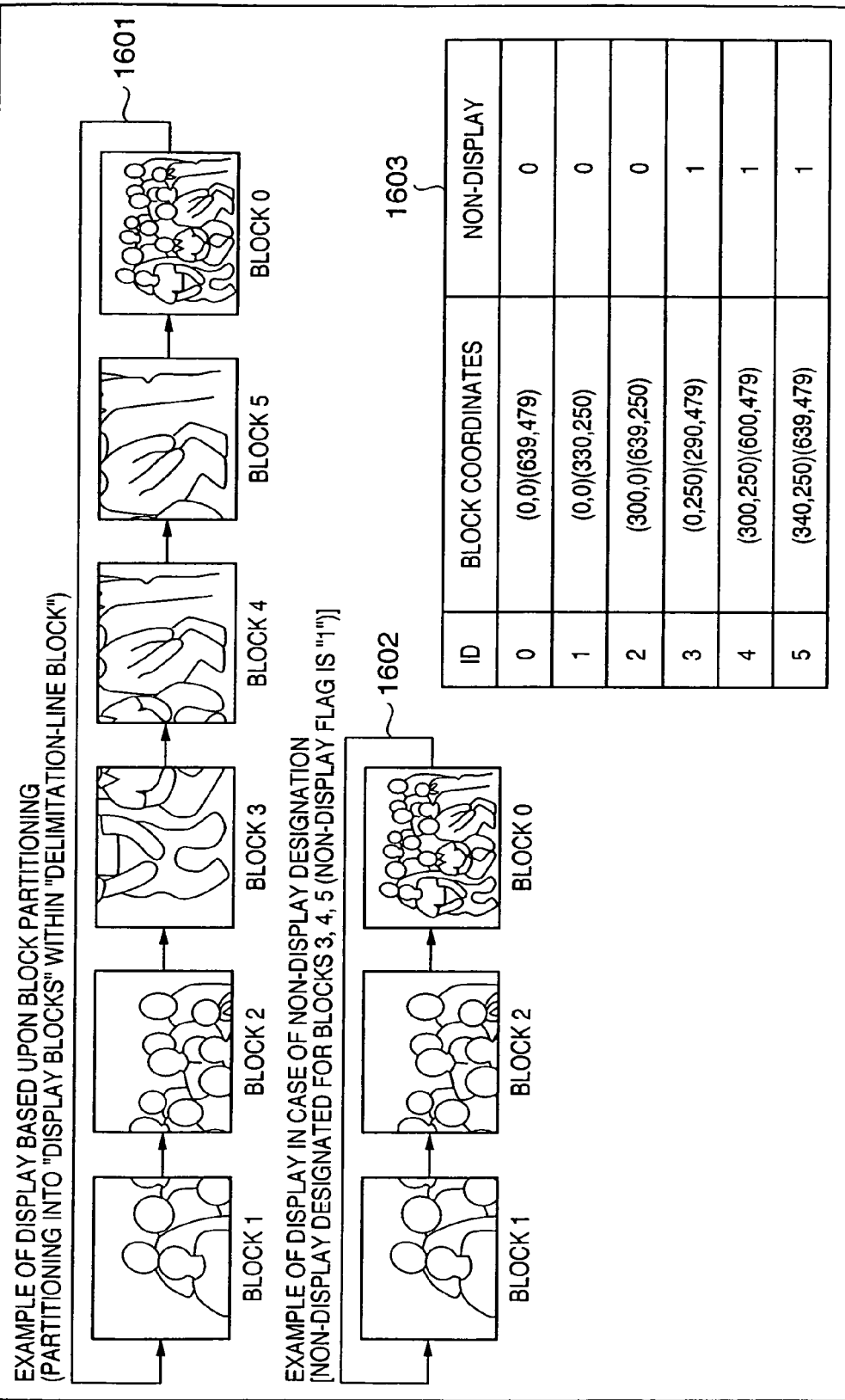

INFORMATION PROCESSING APPARATUS, METHOD AND STORAGE MEDIUM

FIELD OF THE INVENTION

This invention relates to a display technique for displaying an image as user sees easily.

BACKGROUND OF THE INVENTION

So-called "zooming" is known as a display technique for enlarging and reducing the size of any area of an image, which is displayed on a screen, to display the area at an optimum size. Zooming generally can be classified as follows depending upon how what particular area of an image displayed on a screen is zoomed: First, the entire screen is displayed upon zooming it to any size using the center of the screen as a reference. This is the most common type of zooming (for example, see the specification of Japanese Patent Application Laid-Open No. 09-026769). Second, there is zooming referred to as "point zooming". In this type of zooming, zooming is performed to any size centered on a point that the operator has designated in an image displayed on a screen, and the zoom display is presented in such a manner that the point is situated at the center of the screen after zooming (for example, see the specification of Japanese Patent Application Laid-Open No. 2001-324974). Third, there is zooming referred to as "area zooming". In this type of zooming, the zoom display is presented in such a manner that the area specified by the operator is zoomed so as to fit the size of the screen (for example, see the specification of Japanese Patent Application Laid-Open No. 11-282454).

Further, methods of designating an area (method of area designation operation) used in the "area zooming" known generally include a method of designating a rectangle based upon a diagonal line and a method of designating the area upon changing the position or size of a rectangle provided in advance.

However, in the first type of zooming (Japanese Patent Application Laid-Open No. 09-026769), the fact that the zooming reference is the center of the screen means that the image zoomed and displayed on the screen will not necessarily coincide with the area that the operator actually desires to be zoomed and displayed. For this reason, the operator must perform a position adjustment appropriately using vertical and horizontal scrolling functions (and carry out zooming again in certain cases) after zooming in such a manner that the area that the operator desires to be zoomed will be displayed upon being fitted to the screen.

In the case of the second type of zooming (Japanese Patent Application Laid-Open No. 2001-324974), the point desired to be zoomed and displayed can be designated by the operator, but since zooming is performed centered on the point designated by the operator, it is required that the operator designate accurately the center position of the area desired to be zoomed and displayed. In actuality, however, it is difficult for the operator to designate the center position accurately, and the zoom display obtained may not coincide with the area the user desires to zoom and display. As in the first type of zooming, it is necessary for the operator to perform a position adjustment appropriately (and carry out zooming again in certain cases) after zooming so as to display the image on the screen as desired.

In the third type of zooming (Japanese Patent Application Laid-Open No. 11-282454), the area desired to be zoomed and displayed can be designated at will and displayed so as to fit the size of the screen. This makes it possible to avoid the problem of non-coincidence between the area desired to be zoomed and displayed and the area actually zoomed and displayed. However, in order to implement area zooming, areas desired to be zoomed and displayed require commands individually, whenever zooming is carried out, through use of designating input means such as a pointing device to enter the extent of the area desired to be zoomed and displayed. When it is desired to perform zooming with respect to a plurality of areas, a technical problem which arises is poor operability.

Furthermore, in instances where part of an image that will not fit on the screen is zoomed, it is required with all of the first to third types of zooming that the image be moved using the vertical and horizontal zooming functions before zooming so that the area desired to be zoomed and displayed will be displayed temporarily on the screen. In this case also a technical problem which arises is poor operability.

Another method of designating an area is to analyze image information, extract an area based upon the layout or features using a recognition technique and designating this area as the scope of the display (see the specifications of Japanese Patent Application Laid-Open Nos. 06-282258 and 08-202856). However, this method not only is not effective for application to an image from which features are difficult to extract, but the user must also perform a selecting and specifying operation with respect to areas that have been decided as a result of automatic recognition. Consequently, a technical problem which arises is poor operability in a case where an area desired to be displayed has been decided beforehand.

SUMMARY OF THE INVENTION

Accordingly, an object of the present invention is to provide a display technique whereby it is possible for an area, which an operator desires to zoom and display, to be zoomed and displayed in accordance with the size of the screen through a simple operation.

According to the present invention, the foregoing object is attained by providing an information processing apparatus capable of displaying any area, which has been designated in an image displayed on a screen, upon enlarging the area, comprising: partitioning unit configured to partition the image displayed in the screen into any area based upon a given command; identifying unit configured to identify each area of the image partitioned by the partitioning unit; storage control unit configured to store each area identified by the identification in storage means in association with the displayed images; and renewal designating unit configured to renewal-designate designating information in order for designating the each area; wherein an area, which has been designated by designating information, is enlarged and displayed in accordance with the size of the screen.

In accordance with the present invention, it is possible for an area that an operator desires to zoom and display to be zoomed and displayed in accordance with the size of the screen through a simple operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates an example of a delimitation line table generated as the result of a block forming step, and an example of a block table generated from the same table, in this information processing apparatus;

FIG. 6 illustrates an example of a delimitation line table generated as the result of a block forming step, and an example of a block table generated from the same table, in this information processing apparatus;

FIG. 7 is a diagram illustrating a specific example of processing in a case where block formation is performed by block formation processing and an area zoom display is performed in this information processing apparatus;

FIG. 15 illustrates an example of a delimitation line table generated as the result of a block forming step, and an example of a block table generated from the same table, in the information processing apparatus of the third embodiment; and FIG. 16 is a diagram illustrating an example of operation and display in a case where an image region in which blocks are formed by block formation processing undergoes a block-zoom display operation (operation in which blocks undergo area zooming in order) in the information processing apparatus 1100.

DETAILED DESCRIPTION OF THE PREFERRED EMBODIMENTS

Preferred embodiments of the present invention will now be described in detail in accordance with the accompanying drawings.

First Embodiment

First, the meaning of each term used in the following description will be defined. In the following, "the number of blocks" is the number of partitioned blocks, which is calculated by the number of delimitation lines. Further, "the total number of blocks" is the number of pieces of the block information stored in a block table, which is calculated by the number of blocks plus 1. Further, a "variable L" is the number of pieces of the block information stored in the block table, which is used for specifying the largest ID in the block table.

<External Appearance of Information Processing Apparatus>

Figure 11:
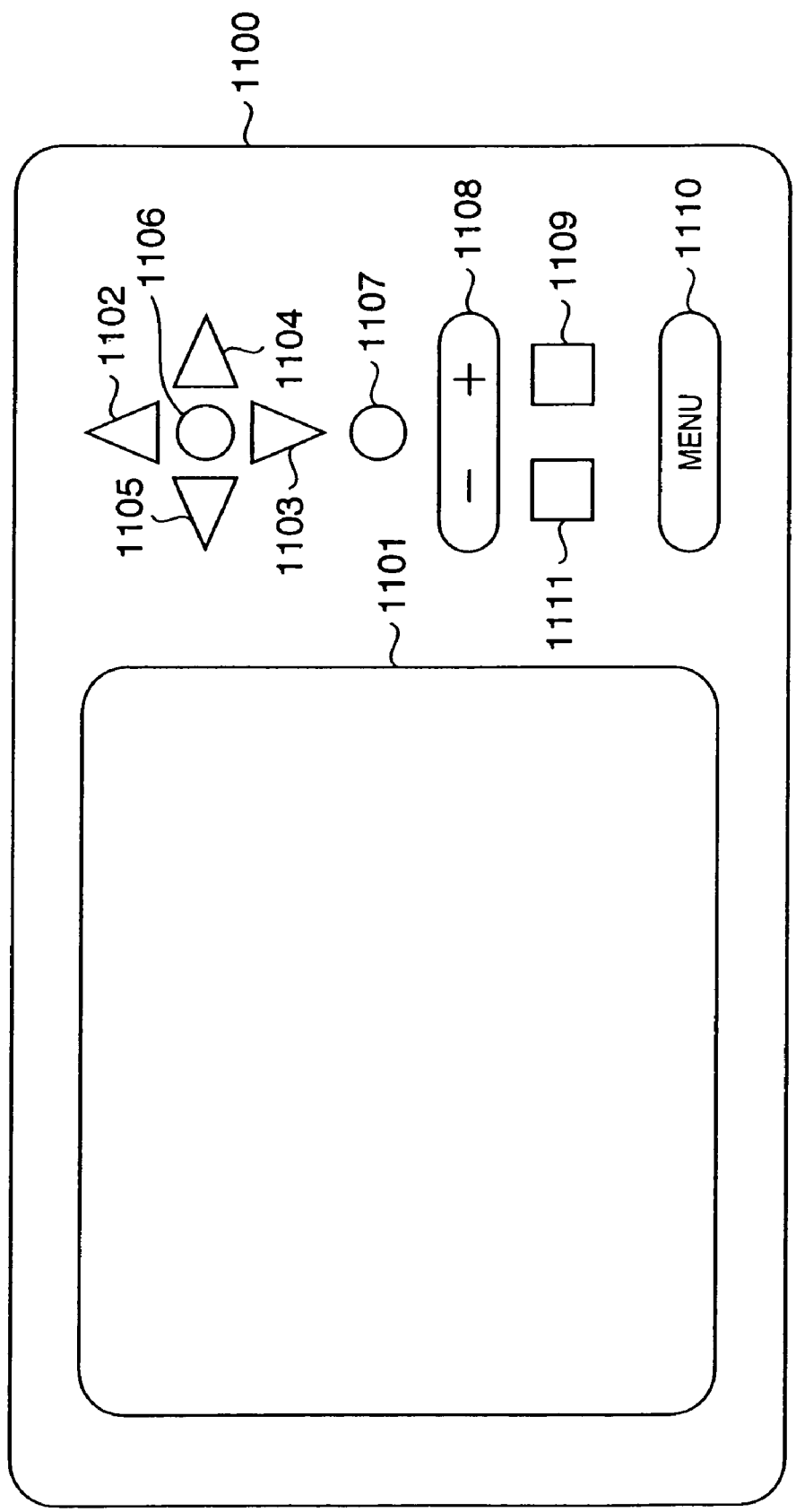
FIG. 11 is a diagram illustrating the external appearance of an information processing apparatus according to an embodiment of the present invention.

FIG. 11 is a diagram illustrating an example of the external appearance of an information processing apparatus 1100 according to an embodiment of the present invention. The apparatus includes a display screen 1101 for displaying an entered image, and a block zoom changeover button 1109 whereby a block zoom mode (the details of which will be described later) possessed by the information processing apparatus 1100 is switched between ON and OFF. When a block zoom changeover button 1109 is pressed in a state in which a processing object image is displayed in a screen, a block zoom mode is turned ON, and when the button is depressed again while executing the block zoom mode, the block zoom mode is turned OFF. Further, in the block zoom mode, on the occasion of an error in a case where information designating the processing object block is not obtainable, the block zooming mode is turned OFF without going through the block zoom mode OFF operation by an operator.

The apparatus further has cursor keys 1102 to 1105. When the block zoom mode is OFF, an image displayed on the display screen 1101 can be scrolled up, down, left and right by pressing these cursor keys.

When the block zoom mode is ON, a pointer (a display indicating that a block has been designated) is moved between blocks (areas of the image delimited by the operator), which are contained in the image displayed on the display screen 1101, by pressing the cursor keys. The pointer is moved to a block in a higher layer by pressing an up cursor key 1102, to a block in a lower layer by pressing a down cursor key 1103, to the next block in the same layer by pressing a right cursor key 1104, and to the previous block in the same layer by pressing a left cursor key 1105.

A shift key 1106 is used in combination with the other keys. If any of the cursor keys 1102 to 1105 is pressed while the shift key 1106 is held depressed in the block zoom mode, a delimitation line for delimiting an image, which has been displayed on the display screen 1101, into any desired blocks is displayed on the screen, and the delimitation line moves in the direction of the cursor key. The up cursor key 1102 and down cursor key 1103 are used to move a horizontal delimitation line up and down, and the right cursor key 1104 and left cursor key 1105 are used to move a vertical delimitation line left and right.

A non-display key 1111 is for designating a block that the user does not wish to be displayed in the block zoom mode. If the non-display key 1111 is pressed in a state in which a block is being zoomed and displayed on the display screen, a non-display flag for this block in the block table is rewritten and the block is not displayed. The non-display flag indicates OFF when it is "0" and ON when it is "1". The initial value of this flag is "0 ".

The apparatus further includes a zoom key 1108 that is for zooming the image on the entire display screen 1101 to any size, irrespective of the mode (the block zoom mode or other mode), using the center of the screen as the reference. Further, in the area designation operation, in a state in which the shift key 1106 is depressed, the zoom key 1108 is depressed to display a rectangular, thereby designating the inside of the rectangular area as a zoom display object. In this operation, in a state in which the rectangular is displayed, the position of the displayed rectangular is moved by the operation of cursor keys 1002 to 1105, and moreover, by depressing the zoom key 1108, the size of the displayed rectangular is changed and the selected area is adjusted. Further, by depressing the ENTER key 1107, an area-zoom display is performed for the displayed rectangular area. It should be noted that the display showing the selected area by the area designation operation may be not limited to the rectangular, and for example, it may be a circular or a segment showing the diagonal line of the area.

An ENTER key 1107 finalizes various operations. For example, a delimitation line that has been moved to a desired position by pressing the cursor keys 1102 to 1105 in the block zoom mode is fixed at this position by pressing the ENTER key 1107. Further, a block that has been designated by the pointer in a state in which an image has been delimited into any desired blocks by delimitation lines is zoomed so as to fit the display screen 1101 by pressing the ENTER key 1107. Further, in a state in which the rectangular for designating the selected area is displayed by the area designation operation, the selected area displayed by depressing the ENTER key 1107 is zoomed so as to fit to the display screen 1101.

A menu button 1110 causes various menus to be displayed. For example, the capture of an image displayed on the display screen 1101 is performed on accordance with a menu displayed by pressing the menu button 1110. Further, by pressing the menu button 1110, automatic/manual layout analysis can be selected as the setting of a block-forming designation (the details of which will be described later).

(System Configuration of Information Processing Apparatus>

Figure 1:
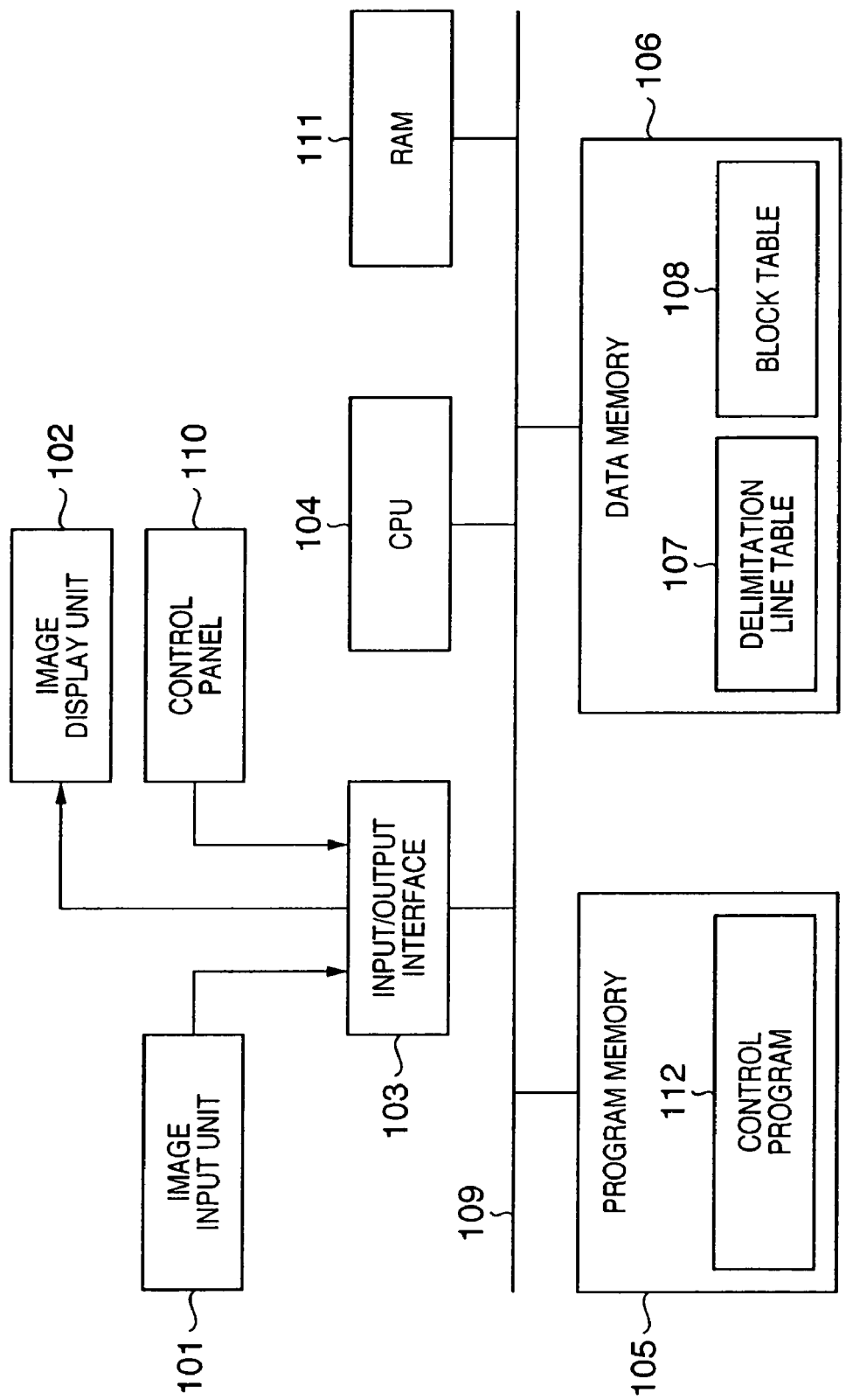
FIG. 1 is a diagram illustrating the system configuration of an information processing apparatus.

FIG. 1 is a diagram illustrating the system configuration of the information processing apparatus 1100. In FIG. 1, an image input unit 101 has a function for entering an image displayed by an image display unit 102. The image display unit 102 (which conceptually includes the display screen 1101) has a function for displaying the entered image. A control panel 110 includes the above-mentioned cursor keys, various keys, and various buttons. The apparatus further includes an input/output interface 103 via which the image input unit 101, image display unit 102 and control panel 110 are connected to a bus 109 so as to send and receive data.

A program memory 105 stores a control program 112 for implementing an information processing method (a processing method illustrated in the flowcharts of FIGS. 2, 3 and 4, described later) according to this embodiment. A data memory 106 stores data (a delimitation line table 107, block table 108, etc.) processed by the control program 112. The apparatus further includes a central processing unit (CPU) 104. Under the control of the CPU 104, the control program 112 and tables 107, 108 are loaded into the RAM 111 through the bus 109 and the program is executed by the CPU 104.

<Flow of Processing (Overall) in Information Processing Apparatus>

Figure 2:
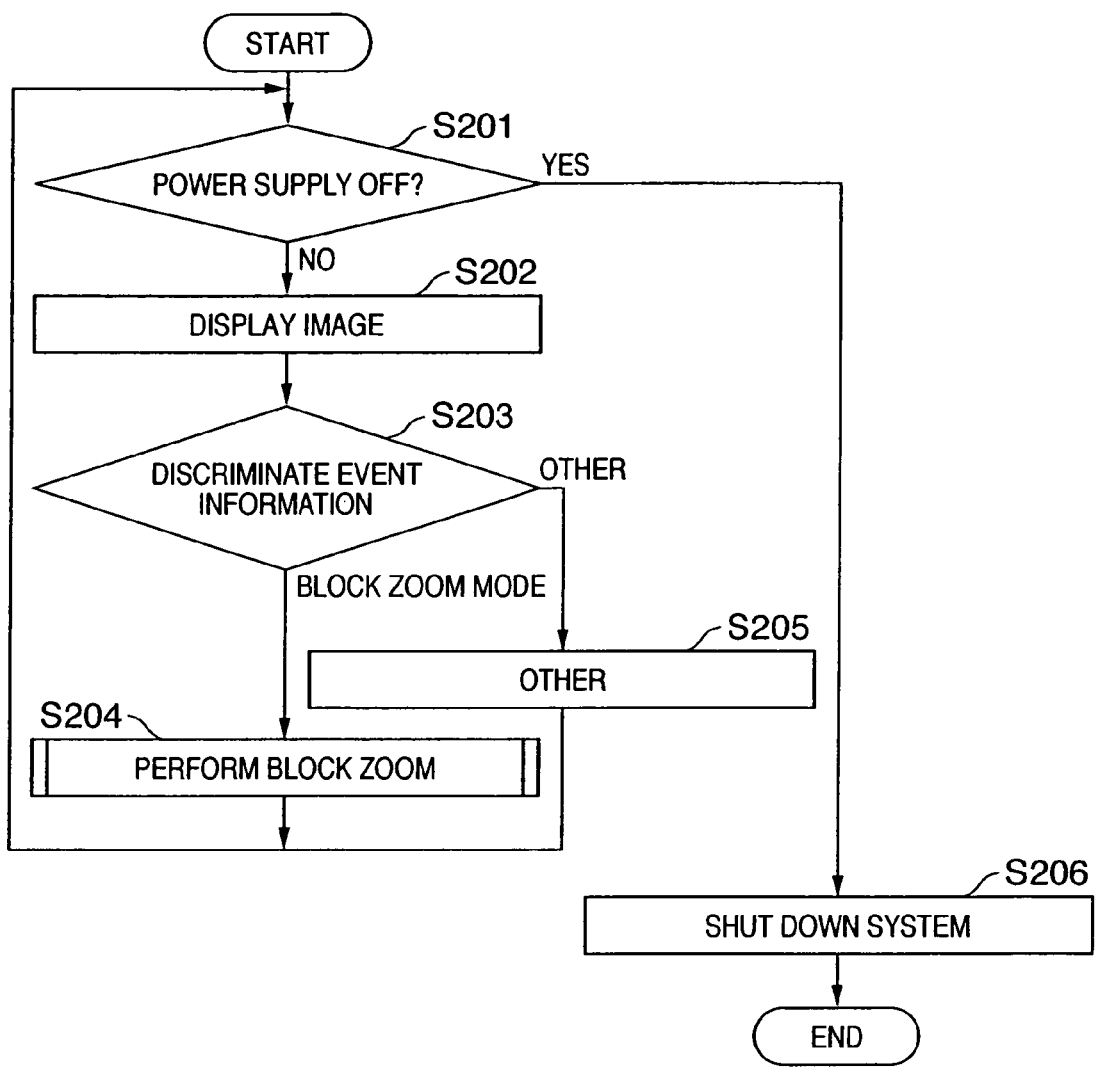
FIG. 2 is a flowchart illustrating the flow of overall processing in this information processing apparatus.

FIG. 2 is a flowchart illustrating the flow of overall processing in the information processing apparatus 1100. When the system is started up, whether the power supply is off or not is checked at step S201 in FIG. 2. If the power supply is not off, control proceeds to step S202. Image display processing is executed at step S202, whereby an image that has entered from the image input unit 101 is displayed on the display screen 1101.

Event information (information produced in response to operation of various buttons on the information processing apparatus 1100 by the operator) is discriminated at step S203 and control proceeds to step S204 if the information is indicative of the block zoom mode. The image displayed on the display screen 1101 is subjected to block zoom processing (the details of which will be described later) at step S204. If the information is not indicative of the block zoom mode, on the other hand, then control proceeds to step S205, at which processing other than block zoom processing is executed. (Since this other processing is not directly related to the present invention, it will not be described in detail here.)

When the processing at step S204 or S205 is completed, control returns to step S201, where it is determined whether the power supply is off. If the power supply is not off, then the processing of steps S202 to S205 is repeated. If the power supply is off, then control proceeds to step S206 and the system is shut down.

<Flow of Block Zoom Processing>

Figure 3:
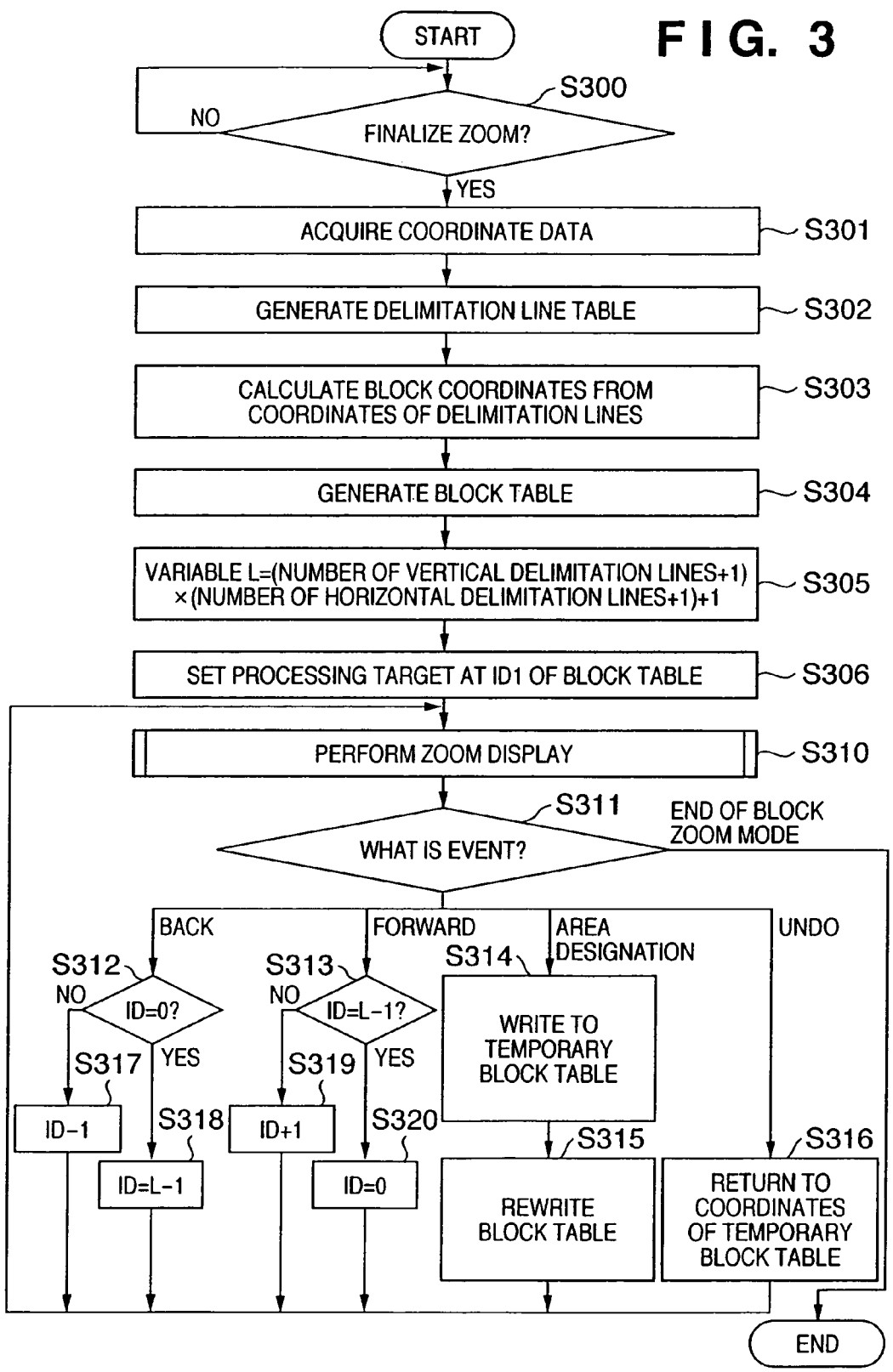
FIG. 3 is a flowchart illustrating in detail the flow of block zoom processing in this information processing apparatus.

The details of block zoom processing (step S204) will be described with reference to FIG. 3. By pressing the block zoom changeover button 1109 to effect a changeover to the block zoom mode, block zoom processing is started up. At step S300, the apparatus waits for execution of a zoom finalization operation (depression of the ENTER key 1107). If the zoom finalization operation is executed at step S300, control proceeds to step S301, at which coordinate data (which indicates the positions of delimitation lines) that has been entered from the control panel 110 and stored in memory is acquired. This is followed by step S302, at which a delimitation line table (see 501 in FIG. 5) is generated based upon the coordinate data. The starting- and end-point coordinates of each delimitation line are described in the table 501 in correspondence with an ID number that indicates each delimitation line.

At step S303, block coordinates [coordinates of the diagonal of each rectangular area (block) that has been delimited by delimitation lines] are calculated by referring to coordinate data in the delimitation line table 501, and then a block table (see 502 in FIG. 5) is generated at step S304. The block coordinates of each block are described in the table 502 in correspondence with an ID number of each block.

The value added with 1 to the number of partitioned blocks is stored in the variable L at step S305. The variable L is equal to the number of pieces of the block information stored in the block table, and is used for specifying the largest ID in the block table. It should be noted that the number of partitioned blocks is calculated from the number of delimitation lines ((the number of vertical delimitation lines+1)×(the number of horizontal delimitation lines+1)). On the occasion of calculating the variable L, the segment-adding 1 to the number of partitioned blocks is a segment of the ID0, which takes the entire image including the number of portioned blocks as a block. The processing target to undergo area zoom processing is set at ID1 in the block table 502 (that is, the block corresponding to ID1 in the block table 502 becomes the block that has been designated by the pointer) at step S306. Next, at step S310, zoom display processing is started up and an area zoom display is presented of the block that is the processing target.

Event information is discriminated at step S311. If the event information is indicative of a "MOVE BACK" operation (operation of the left cursor key 1105 in the block zoom mode), control proceeds to step S312. Here it is determined whether the ID of the block of the processing target (the block that has been designated by the pointer) is 0. If it is determined that ID=0 does not hold (that is, if it is determined that the block currently designated is not the smallest ID of block table), control proceeds to step S317, where the ID is decremented and control returns to step S310. On the other hand, if it is determined that ID=0 holds, control proceeds to step S318, where the ID is made (total block count−1) to thereby move the processing target to the block corresponding to the largest ID (=L−1) in the block table, after which control returns to step S310.

On the other hand, if it is found at step S311 that the event information is indicative of a "MOVE FORWARD" operation (operation of the right cursor key 1104 in the block zoom mode), control proceeds to step S313. Here it is determined whether the ID of the block of the processing target is the largest ID in the block table (=L−1). If the ID of the block of the processing target is the largest ID in the block table, control proceeds to step S320, where the ID is moved to the top (ID=0) and control returns to step S310. On the other hand, if it is found at step S313 that the ID of the block of the processing target is not the largest ID in the block table, then control proceeds to step S319, where the ID is incremented and control returns to step S310.

If it is found at step S311 that the event information is indicative of an "AREA DESIGNATION" operation (i.e., an operation in which a rectangular is displayed by depressing the zoom key 1108, and an inner area of the rectangular is designated as a selected area, and the selected area is zoomed and displayed by depressing the ENTER key 1107), control proceeds to step S314, and a block table ID of the ID which is set as the current processing object of the block table (that is, a block during display at the execution time of "the area designation operation") and block coordinates are written to the temporary block table. Subsequently, at step S315, the block coordinates of the corresponding ID of the block table are rewritten to the coordinates of the selected area designated by "the area designation operation", and control returns to step S310.

In a case where the event information is found to be indicative of "UNDO" at step S311, control proceeds to step S316, where the ID and the applicable block coordinates are acquired from the temporary block table and the block coordinates corresponding to the ID of the block table 502 are rewritten (i.e., the block coordinates before being changed by the area designation operation is restored). Control then returns to step S310.

Further, in a case where the event information is found to be indicative of "END OF BLOCK ZOOM MODE" (operation of the block zoom changeover button 1109) at step S311, block zoom processing is terminated.

<Area Zoom Display Processing>

Figure 4:
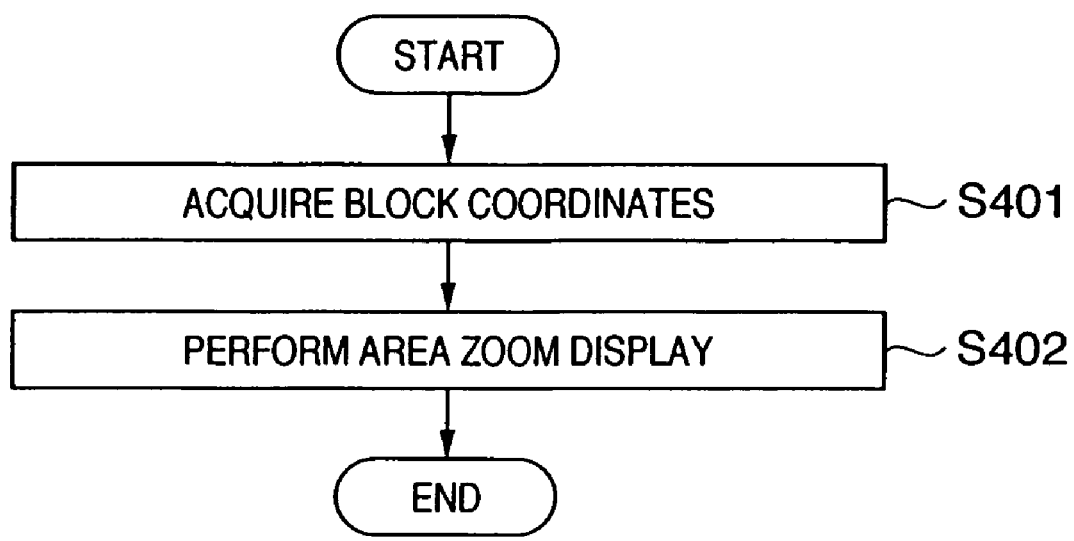
FIG. 4 is a flowchart illustrating in detail the flow of zoom display processing in this information processing apparatus.

FIG. 4 is a flowchart illustrating in detail the flow of zoom display processing of step S310. If zoom display processing is started up by the zoom finalization operation (i.e., if the ENTER key 1107 is pressed in a state in which the image has been delimited into any desired blocks by the delimitation lines in the clock zoom mode), then block coordinate data is acquired from the block table 502 at step S401, and an area zoom display is presented with regard to this block (i.e., the designated block is displayed upon being zoomed to fit the size of the display screen 1101).

<Examples of Delimitation Line Table and Block Table>

FIG. 6 is a diagram illustrating a specific example of the delimitation line table 501, which is generated as a result of block formation processing (steps S301 to S304), and a specific example of the block table 502, which is generated from the delimitation line table 501. As illustrated in FIG. 6, starting-point coordinates (0,0) and end-point coordinates (639, 479) have been stored as initial values in a delimitation line table 601 at ID0 based upon a display size of 640×480 (pixels) of the target image, and coordinates of starting and end points of n-number of delimitation lines have been stored as sets at ID1 to IDn.

A block table 602 has been generated with reference to the delimitation line table 601. Block coordinates (the upper-left and lower-right coordinates of the diagonals of rectangular blocks), which have been calculated from the starting-point and end-point coordinates of the delimitation lines, have been stored as sets in the block table 602. Here the display size of the image that has been associated with the block table 602 is 640×480 (pixels). At ID0, therefore, (0,0) have been stored as starting-point coordinates (X0,Y0) and (639,479) have been stored as end-point coordinates (Xw,Yh). That is, coordinates (0,0), (639,479, which make the entire image a block, have been stored, as initial values, as the block coordinates of ID0.

The block at ID0 is a special block that is equal to the entire display of the image data and contains all blocks obtained by partitioning by delimitation lines. The starting-point coordinates of the block at ID 1 (the first block obtained by partitioning) are equal to the starting-point coordinates of the block at ID0, and the end-point coordinates of the block having the largest ID are equal to the end-point coordinates of the block at ID 0.

Embodiment

FIG. 7 is a diagram illustrating a specific example of an image that has been divided into blocks by block formation processing (steps S301 to S304) and displayed by area zooming (step S402).

The operator partitions a document image 701 into blocks by drawing delimitation lines (lines 1, 2 and 3) horizontally and vertically at portions that the operator wishes to delimit. Numerals 0 to 6 correspond to numbers in the block table 602 of FIG. 6 and indicate the order in which display is presented at the time of the block zoom display. Numeral 0 serving as an initial value makes the entire image a block. When display of blocks 1 to 6 ends, block 0 is displayed again. It should be noted that the block numbers are illustrated in the drawing for the sake of explanation; they may or may not be displayed on the actual screen. Reference numeral 702 denotes an image displayed as a result of area zoom of a block. In this example, block 1 is displayed by area zooming.

The flow of specific processing up to implementation of the area zoom display shown in FIG. 7 will now be described in conformity with the flowcharts above.

When the operator presses the block zoom changeover button 1109, step S204 (block zoom processing) of FIG. 2 is started up. By pressing the cursor keys 1102 to 1105 while the shift key 1106 is being pressed to thereby move the delimitation lines, the delimitation lines (For example, by depressing the cursor keys 1104 to 1105 in a state in which the shift key 1106 is depressed, the line 1 is displayed). When the ENTER key 1107 is depressed in a state in which the delimitation line is displayed, the delimitation line during display is determined, and the delimitation line coordinates are stored in the "delimitation-line register" on the memory.

Similarly, by depressing the cursor keys 1102 to 1103 in a state in which the shift key 1106 is depressed, the line 2 is displayed, and when the delimitation line is determined by depressing the ENTER key 1107, the coordinates of the delimitation line (line 2) during display are stored in the "delimitation-line register" on the memory subsequent to the line 1. Similarly, the delimitation line designation operation is repeated (line 3).

By subsequently further pressing the ENTER key 1107 (the zoom finalization operation), reference is had to the "delimitation-line register" and coordinate data is acquired at step S301, and a delimitation line table of the kind indicated at 601 in FIG. 6 is generated at step S302.

Block coordinates are then calculated from the coordinates in the delimitation line table 601 at step S303 and a block table of the kind indicated at 602 is generated. Subsequently, at step 305, the variable L is calculated and stored in the memory. Since the variable L is calculated by adding 1 to the number of blocks partitioned by the delimitation line, as shown in FIG. 7, the number of vertical delimitation lines is 1 and the number of horizontal delimitation lines is 2, and therefore, the number of partitioned blocks=(1+1)×(2+1)=6, and consequently, the variable L=6+1=7.

Starting- and end-point coordinates indicating the entire image of the document have been stored as ID 0 at the head of the delimitation line table 601. Block coordinates for which the entire image of the document is one block has been stored as ID 0 at the top of the block table 602. In FIG. 7, this block is block 0 and is indicated by numeral 0 and the dashed line at 701 for the sake of convenience.

In this embodiment, three delimitation lines have been drawn and the image has been divided into six blocks, in addition to the $0^{th}$ block, by the delimitation lines. These blocks are indicated as blocks 1 to 6 by the delimitation lines, an enclosure line defined by the dashed line and the numerals 1 to 6, respectively. It will be understood from FIG. 7 and the corresponding block table 602 that there are a total of seven blocks from block 0 and six blocks from block 1 to block 6 acquired by dividing block 0.

When the leading coordinates (0,0), (300,120) of the block table 602 are set as the processing target at step S306, the zoom display processing of FIG. 4 is started up at step S310 and an area zoom display is presented with regard to the acquired block 1 (step S402). If the "MOVE FORWARD" operation (the operation of pressing the right cursor key 1104) is performed, the present processing target IDs of the block table 602 are checked at step S313 and the coordinates are moved to the next block coordinates (0,120), (300,240) (step S319) to thereby display the next block (block 2) by area zooming (step S310). Reference numeral 702 denotes the image of the area zoom display of block 1 thus displayed.

Block 3, block 4, . . . block 6 are displayed by area zooming in similar fashion by the "MOVE FORWARD" operation. If the "MOVE BACK" operation (the operation of pressing the left cursor key 1105) is now performed, the block coordinates of preceding are acquired by referring to the block table 602 and displayed at step S312. If the "MOVE BACK" operation is performed while the current block 0 is undergoing area zoom display as the current processing object, then the block coordinates of the largest ID are acquired by referring to the block table 602 (step S318) and block 6 is presented in the area zoom display. In this manner, during the period until the block zoom mode is completed, the blocks are displayed in order of the partitioned block numbers. The block zoom mode is completed by pressing again the block zoom changeover button 1109.

If the "AREA DESIGNATION" operation is performed with regard to an image currently undergoing area zoom display in the block zoom mode, the block ID and the block coordinates that prevailed before the "AREA DESIGNATION" operation are written to the temporary block table (step S314) and the block coordinates of ID set to present processing object in the block table 602 is rewritten by the coordinates of the selected area designated by the "AREA DESIGNATION" operation (step S315). At this time the block coordinates before being changed can be restored by the "UNDO" operation until the block zoom mode is terminated.

Thus, in accordance with this embodiment as described above, once a plurality of areas for presenting an area zoom display have been decided by entering delimitation lines using cursor keys, the display magnification of each block can be decided at the same time. As a result, operability is enhanced greatly in comparison with area designation using a pointing device as in the prior art.

Further, block information that is the result of forming blocks by entering delimitation lines is stored in association with image data and therefore blocks can be presented in an area zoom display one after another merely by operating cursor keys. As a result, operability is enhanced greatly in comparison with the conventional area zoom display in which an image is scrolled and an area designated whenever zooming is performed.

Second Embodiment

In the first embodiment, an image is delimited into a plurality of blocks by entry of delimitation lines. However, the present invention is not limited to this arrangement and an area to undergo area zoom display may be delimited by another method. A second embodiment of the present invention will now be described. The external appearance of the information processing apparatus, the system configuration thereof and the flow of overall processing are similar to those of the first embodiment (FIGS. 11, 1 and 2) and need not be described again.

Figure 8:
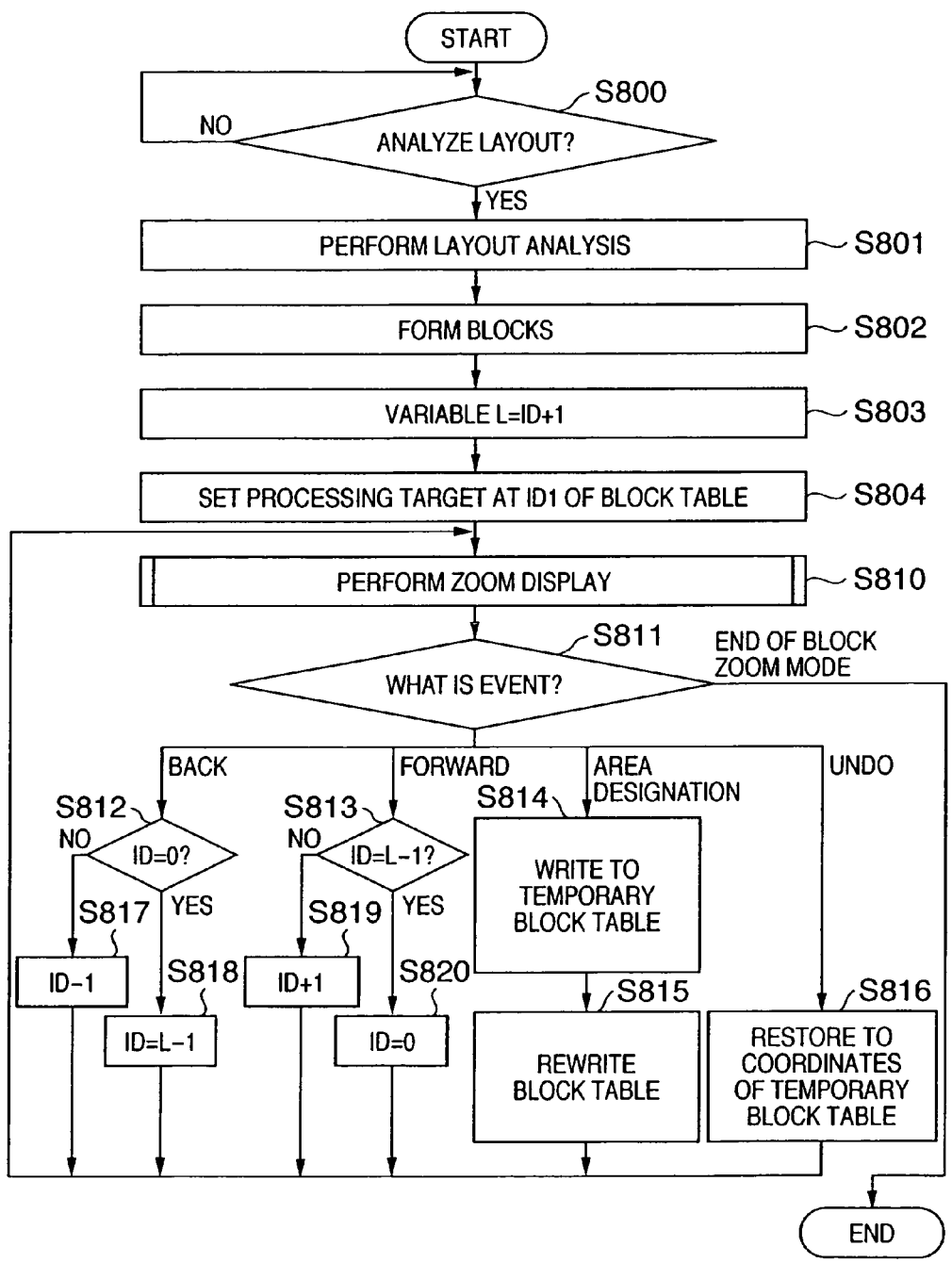
FIG. 8 is a flowchart illustrating the flow of block zoom processing in a second embodiment of the present invention.

FIG. 8 is a flowchart illustrating the flow of block zoom processing (step S204) in the second embodiment. When block zoom processing is launched in FIG. 8, the apparatus waits at step S800 for execution of an operation for designating layout analysis (namely an operation selected using the menu button 1110 in FIG. 11).

If the operation for designating layout analysis is performed at step S800, then control proceeds to step S801, where layout analysis processing is started up, the layout is analyzed by OCR processing and block segmentation is carried out.

At step S802, block formation processing is started up and a block table (see 503 in FIG. 5) is generated based upon coordinate data obtained from the result of layout analysis. At this time, the ID0 of the block table is stored with coordinate data based on the display size of the processing target image as a block taking the entire image as a display area, and the block table subsequent to the ID1 is stored with the coordinates of the block partitioned by the layout analysis result. Next, at step S803, the total number of blocks (=number of divided blocks+1) is calculated and stored as the variable L.

The processing target to undergo area zoom processing is set at the ID1 of the block table 503 at step S804. Next, at step S810, zoom display processing is started up and an area zoom display is presented of the block that is the processing target (the block designated by the pointer).

Event information is discriminated at step S811. If the event information is indicative of the "MOVE BACK" operation, control proceeds to step S812. Here it is determined whether the ID of the block of the processing target is 0. If it is determined that the ID of the block to undergo processing is not 0 (that is, if it is determined that the block currently designated is not the block of smallest ID of the block table), control proceeds to step S817, where the ID is decremented and control returns to step S810. On the other hand, if it is determined that ID=0 holds at step S812, control proceeds to step S818, where the ID is made (block count−1) to thereby move the processing target to the block of the largest ID in the block table 503, after which control returns to step S810.

On the other hand, if it is found at step S811 that the event information is indicative of the "MOVE FORWARD" operation, control proceeds to step S813. Here it is determined whether the ID of the block of the processing target is the largest ID (=L-1) in the block table. If the ID of the block of the processing target is the largest ID (=L-1) in the block table, control proceeds to step 820, where the ID is moved to the head (ID=0) and control returns to step S810. On the other hand, if it is found at step S813 that the ID of the block of the processing target is not the largest ID (=L-1) in the block table, then control proceeds to step S819, where the ID is incremented and control returns to step S810.

If it is found at step S811 that the event information is indicative of the "AREA DESIGNATION" operation, control proceeds to step S814 and the ID which is set as the current processing target of the block table (that is, the ID of the block during display at the executing time of "the area designation operation") and the block coordinates are written in temporary block table. Subsequently, at step S815, the block coordinates of the corresponding ID of the block table are rewritten to the coordinates of the selected area designated by the area designation operation, and control returns to step S810.

In a case where the event information is found to be indicative of "UNDO" at step S811, control proceeds to step S816, where the applicable ID and block coordinates are acquired from the temporary block table and the block coordinates of corresponding ID of the block table 503 are rewritten (that is, the block coordinates are returned to the block coordinates before being changed by the area designation operation). Control then returns to step S810.

Further, in a case where the event information is found to be indicative of "END OF BLOCK ZOOM MODE" at step S811, block zoom processing is terminated.

Embodiment

Figure 9:
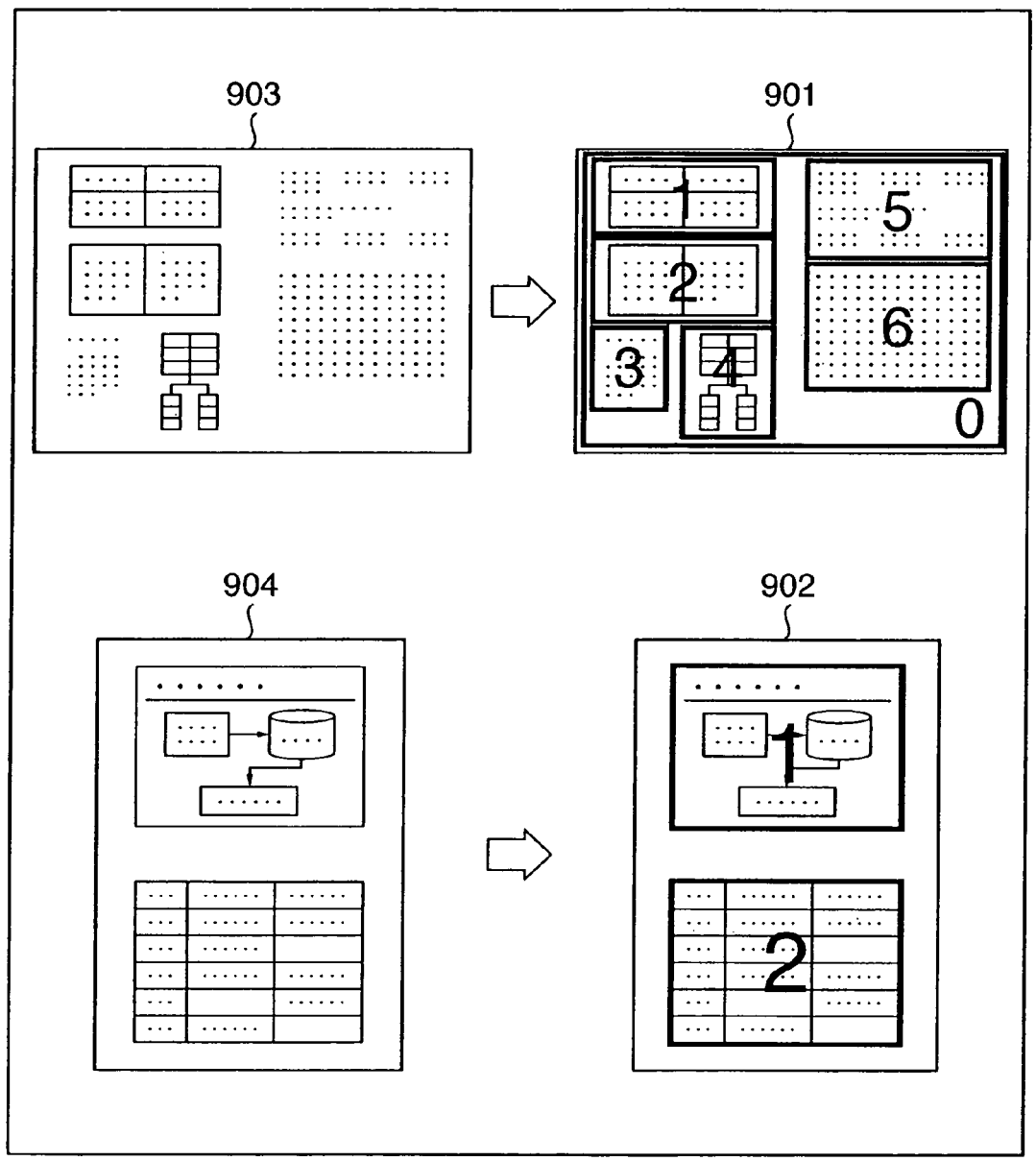
FIG. 9 is a diagram illustrating a specific example of processing in a case where block formation processing is executed by layout analysis processing in the second embodiment.

FIG. 9 is a diagram illustrating a specific example of processing in a case where block formation processing (steps S801, S802) has been executed by layout analysis processing according to the second embodiment. Reference numeral 901 denotes an image obtained by forming blocks utilizing multiple columns of a document image 903. Reference numeral 902 denotes an image obtained by forming blocks utilizing frames line of a document image 904. Here the blocks are formed in area units each of which is enclosed by a frame. In this case, external frames serving as enclosure lines are judged to be frame lines in terms of the entire image and not based upon the frame lines of tables or the like.

Figure 10:
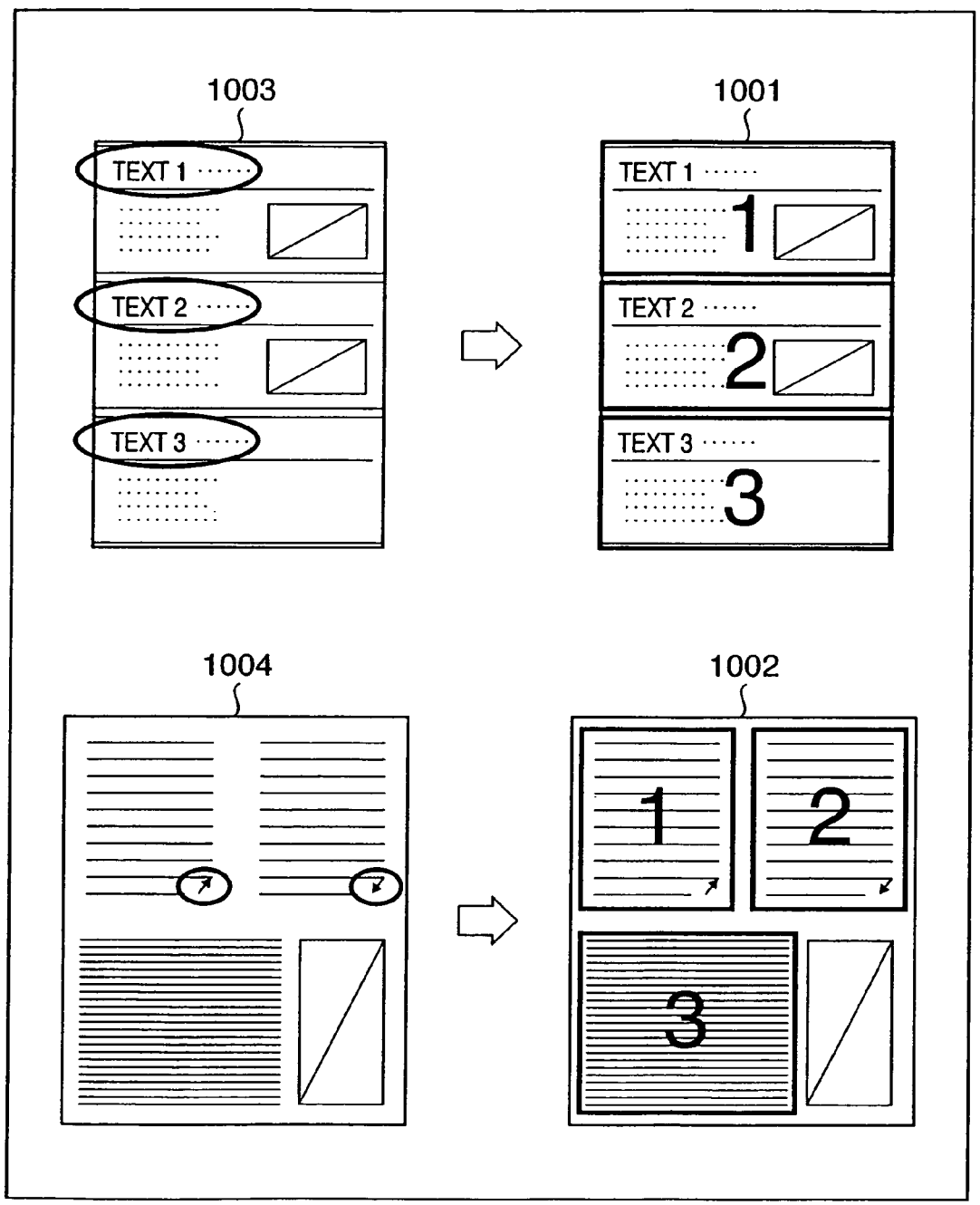
FIG. 10 is a diagram illustrating another specific example of processing in a case where block formation processing is executed by layout analysis processing in the second embodiment.

FIG. 10 is a diagram illustrating another specific example of a case where block formation processing (steps S801, S802) has been performed based upon layout analysis in the second embodiment.

Reference numeral 1001 denotes an image obtained by forming blocks utilizing differences among the character sizes of headings in a document image 1003. Here determination of the blocks is made by layout analysis in view of the fact that heading characters often are displayed large as compared with the entire document.

Reference numeral 1002 denotes an image obtained by forming blocks utilizing arrow symbols. Here determination of the blocks is made by layout analysis in view of the fact that an arrow is sometimes used as a symbol at the end of paragraph in order to indicate the next paragraph.

Reference will be had to the above-described flowchart (FIG. 8) to describe the specific operation of the information processing apparatus 1100 in regard to this embodiment (a case where a document image of the kind indicated at 903 in FIG. 9 is being displayed).

If the block zoom changeover button 1109 is pressed, step S204 (block zoom processing) of FIG. 2 is started up. If layout analysis is selected from the menu button 1110, layout analysis processing is started up at step S801 and layout analysis is executed by OCR processing.

As a result, blocks of the kind indicated at 901 are discriminated from information such as multiple columns and the block table indicated at 503 in FIG. 5 is generated at step S802 (block formation processing) based upon the analytical-result data. The total number of blocks is calculated from the IDs in the block table at step 803 and the total number is stored as the variable L (since the ID is 6, we have L=6+1=7

If block formation processing serving as pre-processing for block zooming thus ends, the ID1 of the block table 503 are set at step S804 as a block to undergo processing. Then, as in the first embodiment, an area zoom display is presented on a per-block basis by the "MOVE BACK" and "MOVE FORWARD" operations, and the area designation and undo operations are carried out.

It should be noted that processing in a case where block formation is performed based upon multiple columns of a document image has been described. However, processing is similar also in a case where block formation is performed based upon frame lines or enclosure frames. This is particularly effective in cases where a plurality of pages are made a document image consisting of a single sheet.

Further, the same holds in a case where block formation has been carried out based upon the size of heading characters, as indicated at 1001, and in a case where block formation has been performed based upon arrow symbols in text, as indicated a 1002. This is particularly effective when applied to a document image such as that of a magazine article. Block formation may be performed based upon chapter numbers or page numbers, and processing in these cases would be executed in similar fashion.

Thus, in accordance with this embodiment, as will be obvious from the description above, by subjecting a document image in particular to layout analysis, a document image for presenting an area zoom display can be divided into blocks. As a result, operability is enhanced further in comparison with conventional area designation and in comparison with the first embodiment.

Further, block information that is the result of forming blocks by layout analysis is stored in association with image data and therefore blocks can be presented in an area zoom display one after another merely by operating cursor keys. As a result, operability is enhanced greatly in comparison with the conventional area zoom display in which an image is scrolled and an area designated whenever zooming is performed.

Third Embodiment

In the first embodiment, rectangular areas delimited by inputting delimitation lines are made blocks and the blocks are subjected to area zooming so as not to overlap one another. However, the present invention is not limited to this arrangement and may be adapted to perform area zooming upon deciding blocks in such a manner that the interior of a rectangular area that has been delimited by delimitation lines is displayed thoroughly. Thoroughly displaying the interior of a rectangular area means allowing overlapping of blocks presented in an area zoom display in a rectangular area that has been delimited by delimitation lines. In addition, the delimitation line and the number of blocks do not necessarily correspond.

For the sake of simplicity, each rectangular area delimited by delimitation lines shall be referred to as a "delimitation-line block", and each rectangular area that is actually displayed by area zoom shall be referred to as a "display block". It should be noted that the term "block" used in the description of all of the embodiments refers to a "display block" that actually undergoes zoom display. That is, in the first embodiment, a "delimitation-line block" and a "display block" are the same. In this embodiment, however, a "delimitation-line block" and a "display block" are different.

A third embodiment of the present invention will now be described. The external appearance of the information processing apparatus, the system configuration and the flow of overall processing are similar to those of the first embodiment (FIGS. 11, 1, 2) and need not be described again.

<Flow of Block Zoom Processing>

The details of block zoom processing (step S204) will be described with reference to FIG. 13.

By pressing the block zoom changeover button 1109 to effect a changeover to the block zoom mode, block zoom processing is started up.

When the processing starts, the apparatus waits at step S1300 until the zoom finalization operation (operation to depress the ENTER key 1107) is executed.

In this state (state in which the image that is the current processing object is displayed in the block zoom mode), the operator turns any area, where the area zoom display is desired, into a block formation by the delimitation line designation operation. This operation and processing will be described below. First, by the delimitation line designation operation (operation to depress the cursor keys 1102 to 1105, while depressing the shift key 1106), the delimitation lines are displayed on the display screen, and subsequently, by depressing the cursor key, the lines are moved to any position. At this time, while the delimitation lines remain to be displayed even when the shift key 1106 is released, when the delimitation line designation operation (operation to depress the cursor keys 1102 to 1105, while depressing the shift key 1106) is newly performed, new and separate delimitation lines are displayed in place of the delimitation lines previously displayed. In a state in which the delimitation lines are displayed, the ENTER key 1107 is subsequently depressed so as to determine the delimitation lines. At this time, the coordinate data (coordinate data showing the position of the delimitation lines) inputted by the operation unit 110 is written in the temporary memory when the delimitation lines are displayed (coordinate data that is written in the temporary memory accompanied with the movement of the delimitation lines is renewed), and is stored in the delimitation line register by depressing the ENTER key 1107 in a state in which the delimitation lines are displayed.

Thus, until the zoom finalization operation is performed (i.e., until the ENTER key 1107 is operated), the coordinate data of the finalized delimitation lines is stored successively in the delimitation-line register. In this embodiment, the delimitation lines pass through the display screen in the horizontal or vertical direction.

At step S1300, when the zoom finalization operation is executed, at step 1301, the delimitation-line register is referred to, and the delimitation line coordinate data (coordinate data to show the positions of the delimitation lines) is obtained. At the subsequent step S1321, it is determined whether or not the acquirement of the delimitation coordinate data proves successful. In case the delimitation coordinate data is not acquired (in case the delimitation coordinate data is not available in the delimitation line register), at step S1307, it is checked whether or not there is any block table available, which is associated with the image data that is the current processing object. At step S1307, in case the block table is available, control proceeds to the processing of step S1305.

In case, at step S1321, there is no delimitation line coordinate data available in the delimitation line register, and moreover, at step S1307, there is no block table available, which is associated with the image data that is the current processing object, since there exists no processing object block, the block zoom processing is completed. At this time, though no mention made in the present embodiment, through dialogues and the like, a message notifying the operator of the fact that there is no block formation made may be presented.

If the acquirement of the delimitation coordinate data proves successful at step S1321, this is followed by step S1302, at which a delimitation line table [a table (see 1501 in FIG. 15) in which starting- and end-point coordinates of each of the delimitation lines have been described in correspondence with ID numbers indicating the delimitation lines] is generated based upon the coordinate data.

At step S1303, block-coordinate calculation processing is started up and block coordinates [coordinates of the diagonal of each rectangular area (block) displayed by area zoom] are calculated in conformity with the aspect ratio of the display screen by referring to coordinate data in the delimitation line table 1501.

Figure 14:
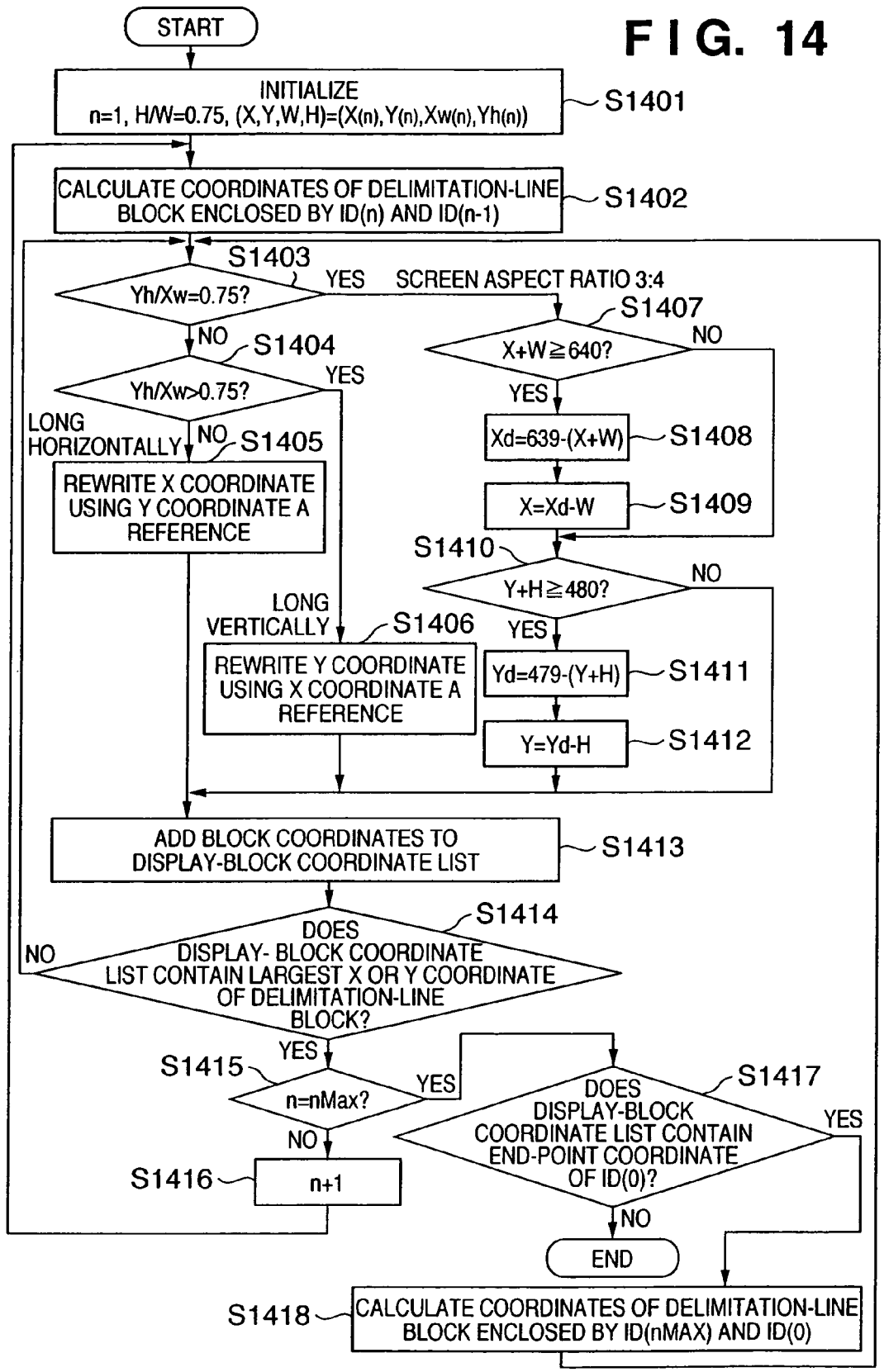
FIG. 14 is a flowchart illustrating the flow of block-coordinate calculation processing that is started up in block zoom processing in the information processing apparatus of the third embodiment.

The details of block-coordinate calculation processing will be described in detail with reference to FIG. 14. At step S1401 in FIG. 14, the temporary memory used in this processing is initialized and the following values are set:

n=1

H/W=0.75

(X,Y,W,H)=X(n), Y(n), Xw(n), Yh(n)

where n represents an ID number of the delimitation-line table, and H/W indicates the coefficient of aspect ratio calculated from the size of the image to be displayed. Further, (X,Y,W,H) indicates data stored in a display-block coordinate list, where the following is set: X=X(n): starting-point X coordinate (smallest X coordinate) of delimitation line ID(n); Y=Y(n): starting-point Y coordinate (smallest Y coordinate) of delimitation line ID(n); X=Xw(n): end-point X coordinate (largest X coordinate) of delimitation line ID(n); and Y=Yh (n): end-point Y coordinate (largest Y coordinate) of delimitation line ID(n).

In this embodiment, the calculated coordinate values are stored in the display-block coordinate list in the order of calculation and a block table, described later, is generated by referring to this list.

At step S1402, the block coordinates of an area (delimitation-line block) enclosed by delimitation lines of IDs ID(n) and ID(n−1) [the smallest XY coordinates of ID(n−1) are adopted as the starting-point coordinates, and the largest XY coordinates of ID(n) are adopted as the end-point coordinates].

At step S1403, the aspect ratio of the calculated block coordinates is compared with the aspect ratio of the display screen (i.e., it is determined whether Xh/Ww=0.75 holds). If the aspect ratio is equal to 0.75, then it is determined at step S1407 whether the end-point X coordinate of the block coordinates is situated within the coordinates of the display screen. If the end-point X coordinate is outside the coordinates of the display screen, then the end-point X coordinate is set to Xd=639−(X+W), which is within the coordinates of the display screen (step S1408), and the starting-point coordinate is rewritten based upon the end-point coordinate and the display block size (i.e., the operation X=Xd−W is performed at step S1409).

It is determined at step S1410 whether the end-point Y coordinate of the block coordinates is situated within the coordinates of the display screen. If the end-point Y coordinate is outside the coordinates of the display screen, then the end-point Y coordinate is set to Yd=479−(Y+H), which is within the coordinates of the display screen (step S1411), and the starting-point coordinate is rewritten based upon the end-point coordinate and the display block size (i.e., the operation Y=Yd-H is performed at step S1412).

Next, at step S1413, the calculated block coordinates are added to the display-block coordinate list (the block coordinates are stored in list form in the temporary memory in the order in which they were acquired). At step S1414, reference is had to the list and it is determined whether the list contains the largest X coordinate or largest Y coordinate of the delimitation-line block. If the list does not contain the coordinate (i.e., if the coordinate is not outside the delimitation-line block), then control returns to step S1403 and processing is repeated from this step onward.

If the aspect-ratio coefficient of the block coordinates calculated at step S1402 is greater than 0.75 ("NO" at step S1403 and "YES" at step S1404, i.e., if the "delimitation-line block" has a longer vertical length in comparison with that of the display screen), then the end-point Y coordinate of the display block is rewritten at step S1406 to a coordinate calculated in such a manner that the aspect ratio will become 4:3 with the X coordinate serving as a reference.

If the aspect-ratio coefficient of the block coordinates calculated at step S1402 is equal to or less than 0.75 ("NO" at step S1403 and "NO" at step S1404, i.e., if the "delimitation-line block" has a longer horizontal length in comparison with that of the display screen), then the end-point X coordinate of the display block is rewritten at step S1405 to a coordinate calculated in such a manner that the aspect ratio will become 4:3 with the Y coordinate serving as a reference.

If it is found at step S1414 that the display-block coordinate list contains the largest X coordinate or largest Y coordinate of the delimitation-line block (i.e., if the coordinate is outside the delimitation-line block), it is determined at step S1415 whether the present delimitation line ID(n) is the largest ID (nMAX). If it is not the largest ID, then the operation n+1 is performed at step S1416 to increment the delimitation line ID and control returns to the processing of step S1402.

If it is found at step S1415 that the delimitation line ID is the largest value, then, at step S1418, the block coordinates of the delimitation-line block enclosed by ID(nMax) and ID(0) [the smallest XY coordinates of ID(nMax) are adopted as the starting-point coordinates and the largest XY coordinates of ID(0) are adopted as the end-point coordinates] are calculated and control returns to the processing of step S1403.

Figure 13:
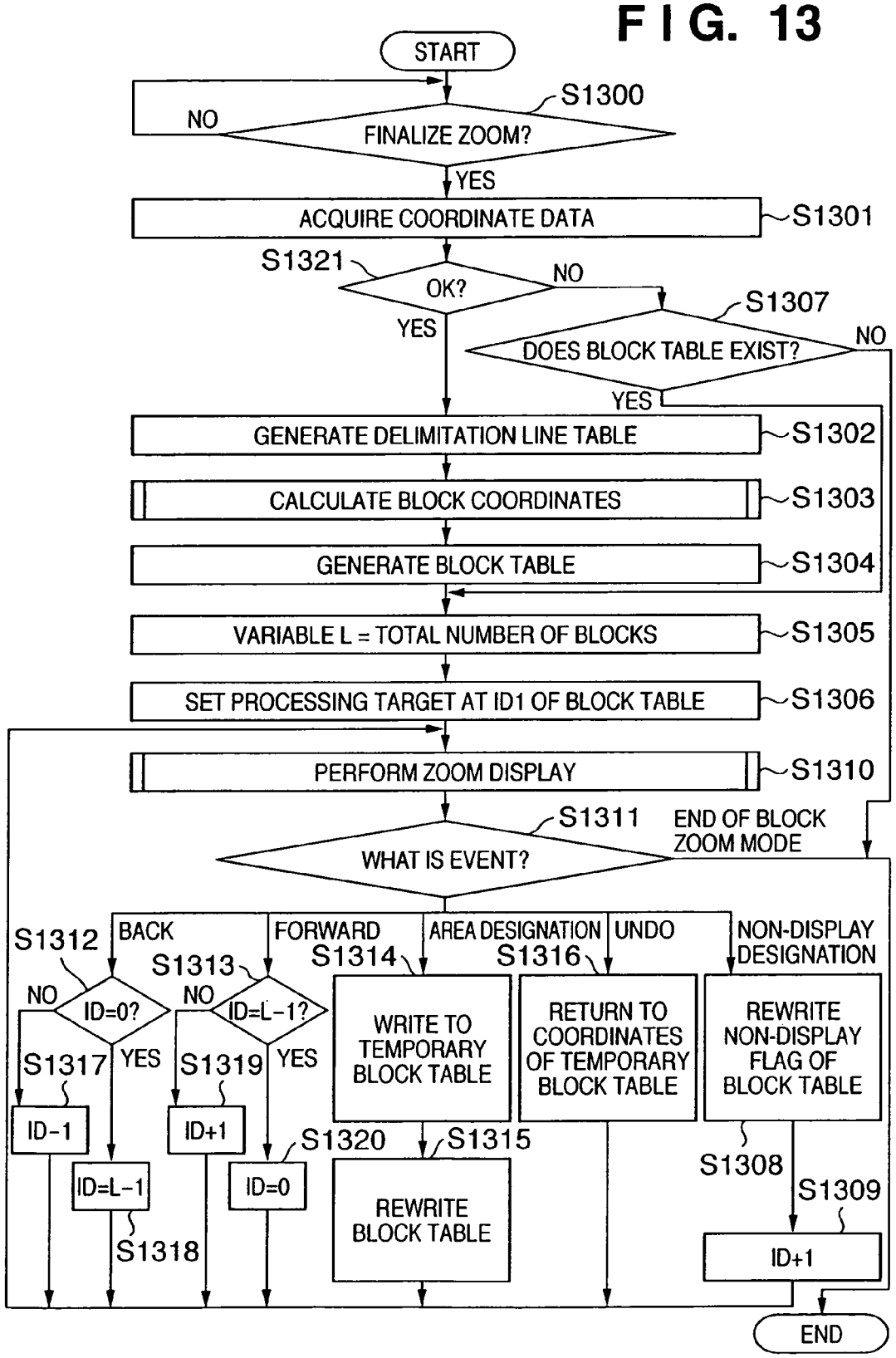
FIG. 13 is a flowchart illustrating in detail the flow of block zoom processing in an image processing apparatus according to the third embodiment.

If it is found at step S1415 that the present delimitation line ID(n) is the largest ID (nMAX) and it is found at step S1417 that the largest XY coordinates of ID(0) are contained in the display-block coordinate list, then processing is exited and control returns to the flowchart of FIG. 13.

Accordingly, with regard to one "delimitation-line block", the starting-point coordinates of block coordinates that will be stored in the display-block coordinate list first are equal to the starting-point coordinates of the block coordinates that have been calculated at step S1402 and stored in the temporary memory, and the end-point coordinates of block coordinates that will be stored in the display-block coordinate list last are equal to the end-point coordinates of the block coordinates that have been calculated at step S1402 and stored in the temporary memory. The block coordinates thus calculated are stored in the display-block coordinate list, in the order in which they were calculated, for every "delimitation-line block" calculated at step S1402 and S1418. Further, with regard to one "delimitation-line block", the sizes of the "display blocks" calculated are fixed. However between delimitation-line blocks of different sizes, the sizes of the "display blocks" differ.

At step S1304, reference is had to the display-block list in memory and a block table [a table (1502 in FIG. 15) in which block coordinates of each block and non-display flag information (described later) are described in correspondence with the ID number (which indicates the order of display at the time of area zoom) of each block] is generated.

The total number of blocks is calculated and is stored as a variable L at step S1305. The total number of blocks is calculated according to (largest ID in block table)+1.

The processing target to undergo area zoom display is set the ID1 of the block table 1502 at step S1306.

Next, at step S1310, zoom display processing is started up and an area zoom display is presented of the block that is the processing target. Event information is discriminated at step S1311. If the event information is indicative of a "MOVE BACK" operation (operation of the left cursor key 1105 in the block zoom mode), control proceeds to step S1312. Here it is determined whether the ID of the block of the processing target (the block that has been designated by the pointer) is 0. If it is determined that ID=0 does not hold, control proceeds to step S1317, where the ID is decremented and control returns to step S1310. On the other hand, if it is determined at step S1312 that ID=0 holds, control proceeds to step S1318, where the ID is made (total block count−1) to thereby move the processing target to the block at the largest ID (=L−1) in the block table, after which control returns to step S1310.

On the other hand, if it is found at step S1311 that the event information is indicative of a "MOVE FORWARD" operation (operation of the right cursor key 1104 in the block zoom mode), control proceeds to step S1313. Here it is determined whether the ID of the block of the processing target is the largest ID (=L−1) in the block table. If the ID of the block of the processing target is the largest ID (=L−1) in the block table, control proceeds to step S1320, where the ID is moved to the top (ID=0) and control returns to step S1310. On the other hand, if it is found at step S1313 that the ID of the block of the processing target is not the largest ID (=L−1) in the block table, then control-proceeds to step S1319, where the ID is incremented and control returns to step S1310.

Further, at step S1311, in case the event information is the "AREA DESIGNATION" operation (operation in which a rectangular is displayed by depressing the zoom key 1108 in a state in which the shift key 1106 is depressed, and an inner area of the rectangular is designated as a zoom display object, and a zoom display area is decided by depressing the ENTER key 1107), control proceeds to step S1314, and the block coordinates of the block table ID during current display are written in the temporary block table. Subsequently, at step S1315, the block coordinates during display are rewritten to the coordinates of the area designated by the "AREA DESIGNATION" operation, and control returns to step S1310.

In a case where the event information is found to be indicative of "UNDO" at step S1311, control proceeds to step S1316, where the ID and block coordinates are acquired from the temporary block table and the block coordinates of corresponding ID of the block table 1502 are rewritten (i.e., the state that prevailed before the display area was changed by the area designation operation is restored). Control then returns to step S1310.

Further, in a case where the event information at step S1311 is indicative of a "non-display designation" (a case where a display block presently under going the area zoom display is set to non-display by pressing the non-display key 1111), control proceeds to step S1308, where the non-display flag of the ID corresponding to the present block of the block table 1502 is set to "1", which indicates the non-display designation (a "0" for the non-display flag indicates that non-display is OFF, and a "1" for the non-display flag indicates that non-display is ON, the initial value being "0"). The block ID is incremented at step S1309 and control returns to step S1310.

Further, in a case where the event information is found to be indicative of "END OF BLOCK ZOOM MODE" (operation of the block zoom changeover button 1109) at step S1311, block zoom processing is terminated.

Embodiment

Figure 12:
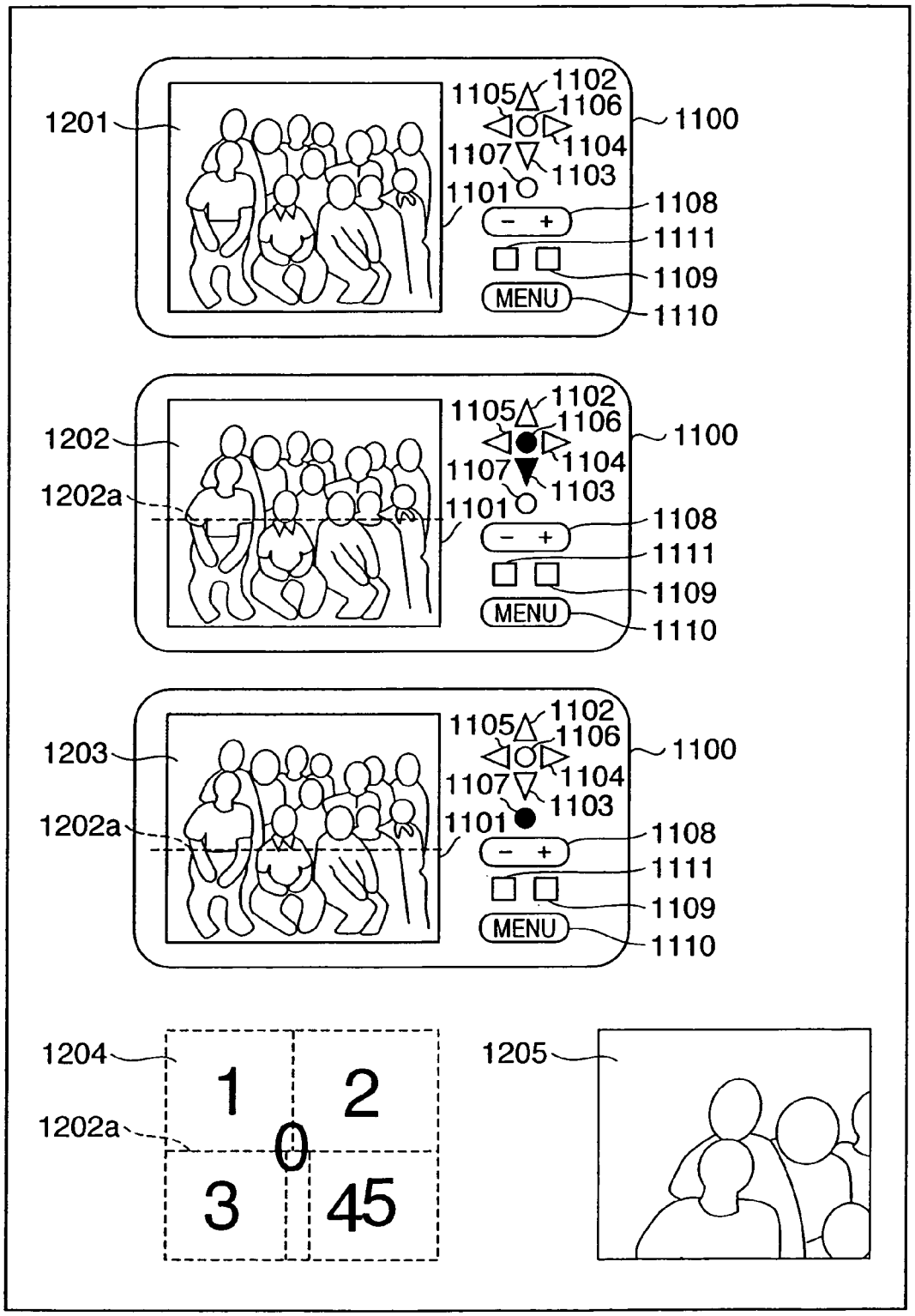
FIG. 12 is a diagram illustrating a specific example of processing in a case where block formation processing has been executed in a third embodiment of the present invention.

FIG. 12 is a diagram illustrating a specific example of processing in a case where block formation processing (FIG. 13) has been executed in response to a delimitation-line command from the user in a third embodiment of the present invention. Reference numeral 1201 denotes a state in which an image to be processed is being displayed on a display unit when the block zoom-mode is OFF. Reference numeral 1202 denotes a state in which, on the occasion of the block zoom mode being turned ON, the delimitation line designation operation (operation by depressing the up cursor key 1102 in a state in which the shift key 1106 is depressed) is performed for the processing object image displayed in the display apparatus so as to display the delimitation line 1202a, and the delimitation line is displayed vertical to (that is, the horizontal line if the cursor key is the up cursor key 1102 or the down cursor-key 1103 and the vertical line if the cursor key is the left cursor key 1104 or the right cursor key 1105) the direction shown by the cursor key. The delimitation line 1202a is being displayed at the center of the screen as an initial display position. Reference numeral 1203 denotes a state in which the delimitation line 1202a has been moved downward (in a direction of the Y coordinate) by pressing the down cursor key 1103. The delimitation-line coordinate data is stored in the delimitation-line register by pressing the ENTER key 1107.

In the display states 1202 and 1203 in FIG. 12, the delimitation line 1202a is shown extending beyond the bounds of the display screen. However, this is for the purpose of explanation and in actuality is not displayed beyond the screen bounds.

Reference numeral 1204 denotes a block that has been calculated (at step S1303 in FIG. 13) based upon the coordinate data of delimitation line 1202a acquired by referring to the delimitation line register (step S1301) as a result of the zoom finalization operation, namely the pressing of ENTER key 1107 in a state in which the delimitation line 1202a has been finalized. At 1204, ID numbers 0 to 5 of calculated display blocks are displayed at the centers of respective ones of the blocks. In actuality, however, it is not always necessary to display these ID numbers.

Reference numeral 1205 denotes a screen (the block first displayed by area zoom) displayed first when the zoom finalization operation has been performed via the operations indicated at 1202 and 1203.

FIG. 16 is a diagram illustrating a specific example of processing at the time of block zoom display in a case where block formation processing (the block-coordinate calculation processing at step S1303) has been executed in the third embodiment.

Reference numeral 1601 denotes an example in which data that has been associated with the block table 1502 is displayed by block zoom. After the zoom finalization operation is performed, first block 1 (ID1 in the block table) is displayed by area zoom. By performing a move forward operation (right cursor key 1104), blocks from block 2 onward are displayed in order one after another. Following block 5, which has the largest block ID, the block returns to that at the top of the block table and therefore block 0 is displayed.

Reference numeral 1602 denotes an example in which image data that has been associated with a block table 1603 is displayed by block zoom. In block table 1603, the non-display flags for IDs 3 to 5 are "1" (the non-display designation is ON). In other words, non-display has been designated for IDs 3 to 5. Accordingly, after the zoom finalization operation is performed, first block 1 is displayed by area zoom. By performing the move forward operation (right cursor key 1104), block 2 is displayed by area zoom. Next, the block returns to that at the top of the block table and therefore block 0 is displayed.

The block table 1603 is a block table obtained by rewriting the block table 1502, which has been generated by the operation shown in FIG. 12, as a result of making the non-display designation for blocks 4 and 5 by the non-display designation operation (by pressing the non-display key 1111 during block display to thereby designate non-display of the block).

Reference will now be had to the flowchart of FIG. 13 to describe the specific operation of the information processing apparatus 1100 with regard to this embodiment (a case where an image of the kind indicated at 1201 in FIG. 12 is displayed).

If the operator presses the block zoom changeover button 1109 when the image like 1201 of FIG. 12 is displayed on the display screen, step S204 (block zoom processing) in FIG. 2 is started up. When this occurs, the apparatus waits for execution of the zoom finalization operation (depression of the ENTER key 1107) at step S1300.

If the up cursor key 1102 is pressed while the shift key 1106 is being pressed, the delimitation line 1202a is displayed on the screen horizontally, as indicated at 1202. Although the delimitation line is displayed at the center of the screen in the initial state, it can be moved to any position by continuously pressing the cursor keys for movement along the vertical direction. Accordingly, by pressing the down cursor key 1103 to move the delimitation line 1202a downward and then pressing the ENTER key 1107 when the delimitation line is displayed, the coordinates data of the delimitation-line 1202a is stored in the delimitation-line register. By further pressing the ENTER key 1107, the zoom finalization operation is performed, the coordinate data stored in the delimitation-line register is acquired at step S1301 and a delimitation-line table of the kind indicated at 1501 in FIG. 15 is generated at step S1302.

At step S1303, block-coordinate calculation processing is started up, block coordinates [coordinates of the diagonal of each rectangular area (block) displayed by area zoom] are calculated based upon the coordinate data in the delimitation line table 1501, and a block table of the kind indicated at 1502 is generated. Next, at step S1305, six is stored in the variable L as the total number of blocks. Since the total number of blocks is calculated according to (largest ID in block table)+1, we have 5+1=6.

The processing target to undergo area zoom display is set to ID1 in the block table 1502 (that is, block 1 becomes the block that has been designated by the pointer) at step S1306.

The block coordinates that make the entire processing-target image 1201 a single block have been stored as ID0 at the top of the block table 1502. In FIG. 12, this is made block 0 and numeral 0 is displayed at 1204 for the sake of convenience.

It should be noted that in this embodiment, a single delimitation line is drawn, the number of "delimitation-line blocks" is two and "display blocks", which display the interior of each of these "delimitation-line blocks" thoroughly, are formed into blocks (steps S1301 to S1304). Numerals 0 to 6 correspond to the block table 1502 of FIG. 15 and indicate the order of display when the block zoom display is presented. Numeral 0 makes the entire image a block as an initial value. When the display of blocks 1 to 6 ends, block 0 is displayed again. The blocks 0 to 6 are indicated at 1204 by the enclosures formed by the delimitation line and dotted lines and by the numerals 0 to 6. The block numbers are illustrated for the sake of explanation and may or may not be displayed on the actual screen.

When the coordinates (0,0), (330,250) of block table 1502 are set as the target of processing at step S1306, the zoom display processing of FIG. 4 is started up at step S1310 and an area zoom display is presented with regard to the acquired block 1 (step S402). If the "MOVE FORWARD" operation (operation of the right cursor key 1104) is performed, the ID of block table 1502 is checked at step S1309, the ID is incremented at step S1309 and the next block (block 2) is displayed by area zoom (step S1310). Reference numeral 1205 in FIG. 12 denotes the image of the area zoom display of block 1 thus displayed.

Similarly, blocks 3, 4, . . . , 6 are presented in the area zoom display by performing the "MOVE FORWARD" operation. If the "MOVE BACK" operation (operation of the left cursor key 1105) is performed, the ID of block table 1502 is checked at step S1312 and the previous block is displayed. If the "MOVE FORWARD" operation is performed while block 5 is being display by area zoom, movement is to the top of the block table 1502 (step S1320) and block 0 is displayed by area zoom.

If the "AREA DESIGNATION" operation is now performed with regard to the image being displayed by area zoom, the block coordinates that prevailed before this operation are written to the temporary block table (step S1314), the block coordinates of corresponding ID of the block table 1502 is rewritten by the coordinates of area designated by the "AREA DESIGNATION" operation (step S1315) and the area zoom display is presented (step S1310). Here, the ID and the block coordinates written in the temporary block table are retained for one each only for each ID, and until the block zoom mode is completed, an "undo operation" is performed during the block is displayed, so that the block coordinate can be reverted to the state before the change.

Thus, in accordance with this embodiment, as described above, by inputting a delimitation line using cursor keys, not only are a plurality of areas for area zoom display decided at one time but blocks are also decided and area-zoomed in such a manner that the interior of rectangular blocks delimited by delimitation lines is displayed thoroughly. In particular, when a zoom display is presented of a photographic image or the like, operability is enhanced greatly in comparison with the conventional methods of designating area using a pointing device or of relying upon a scrolling operation.

Furthermore, since a non-display designation can be made on a per-block basis, only blocks that are desired to be displayed can be displayed in order in simple fashion.

Further, once block information has been put into block form by entry of delimitation lines, the block information can be associated with image data. As a result, blocks can be displayed by area zoom successively merely by operating cursor keys. Accordingly, operability is enhanced greatly in comparison with the conventional area zoom display in which an image is scrolled and an area designation made whenever zooming is carried out.

In this embodiment, it is described that the operation of pressing the non-display key 1111 during display of a block in the block zoom mode is the operation that makes it possible to designate non-display of this block. As another embodiment, however, it is permissible to adopt an arrangement in which an operation that makes it possible to designate non-display is provided by pushing non-display key 1111 with regard to a "delimitation-line block" designated by the designation operation with pointer etc when delimitation lines are displayed. Then, with regard to "display blocks" within a "delimitation-line block" of a designation, the initial value of non-display flags of the corresponding IDs are turned ON when the block table is generated, thereby making it possible to designate non-display of a plurality of display blocks at the same time.

While, in the embodiment, on the occasion of realizing the partitioning means, as shown in FIGS. 7 and 12, the configuration is such that the delimitation lines displayed on the display screen are allowed to be moved by the key operation, the present invention is not particularly limited to such a configuration. For example, the configuration may be such that the delimitation lines are designated and inputted by an action such as drawing a line by finger, pen, and the like on the display apparatus comprising a touch panel.

Further, in the embodiment, as shown in the block tables of FIGS. 5 and 6, though numbers as IDs to discriminate each block area are affixed to a plurality of block areas partitioned by the given command, the present invention is not limited to this, and for example, names may be affixed or other identifications may be affixed.

Further, as evident from the above described explanation, the information processing apparatus according to the embodiment comprises a first storage control function which stores a block table generated by information on the blocks partitioned by partitioning means in association with the previous image data including the partitioned block areas, and further comprises a second storage control function which stores an identification ID of each block obtained as a result of being identified by identifying means in the block table in association with designation information given by the user operation.

"The designation information given by the user operation" referred to here includes information showing a display sequence of the blocks determined by the delimitation line designation operation. It should be noted that, as the information showing a display sequence of the blocks, as described in the embodiment, the ID numbers affixed by the identifying means may be used or numbers different from the ID numbers may be used. Further, the ID numbers may use the numbers affixed by the identifying means or may use the numbers designated by the user operation in the configuration where any display sequence of the blocks can be designated by the user operation.

In addition to the above, "the designation information given by the user operation" includes coordinate information on the display area changed and designated by the area designation operation for any block, and non-display designation information for any block. Furthermore, as information on any block, it is not limited to the non-display designation information, and for example, it may be information to designate a display time and the like. Further, with information to designate a time taken as 0, it may be information designated as non-display.

Further, in the embodiment, as the designation information, though information for displaying a pointer (indicating pointer showing that any area is designated on the screen by cursor key operation by the user in the device as shown in FIG. 11) was to be used, the present invention is not limited to this.

For example, in the screen of the display apparatus comprising a touch panel, it may be the coordinate information designated by touching on the display screen by finger, pen, and the like, and in the display apparatus comprising a pointing device such as a mouse, it may be the coordinate information designated by the pointing device.

Further, as the pointer as the designation information, it may be a frame line surrounding a block during selection or may be a symbol or an icon showing the block or may be not displayed.

Further, in the embodiment, as a device configuring renewal designating means for renewing the designation information of the block displayed by the apparatus such as shown in FIG. 11, though the cursor key was to be used, the present invention is not limited to this, and for example, a rotary device such as a dial may be used. In that case, the designation information is renewed based on the number of rotations and the velocity of a rotational device.

Further, as a device configuring the renewal designating means, a digitizer may be used. In that case, for example, when the screen is tapped once, it is renewed once, and when tapped twice, renewed twice, and so on, so that the designation information is renewed according to the number of operations.

Further, in a display apparatus connected to a voice recognition unit, the apparatus may be configured such that the designation information is renewed according to the voice designation operation of the user.

Further, in a display apparatus connected to a device comprising a sensor, the apparatus may be configured such that the designation information is renewed according to body gesture operations of the user.

Other Embodiments

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments, and the storage medium storing the program codes constitutes the invention.

Examples of storage media that can be used for supplying the program codes are a floppy disk, hard disk, optical disk, magneto-optical disk, CD-ROM, CD-R, CD-RW, magnetic tape, non-volatile type memory card, ROM, DVD (DVD-ROM, DVD-R), etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application Nos. 2004-145491 filed on May 14, 2004 and 2005-135425 filed on May 6, 2005, which are hereby incorporated by reference herein.

What is claimed is:

1. An information processing apparatus capable of displaying any area, which has been designated in an image displayed on a screen, upon enlarging the area, comprising:

a display unit configured to display delimitation line to be used for partitioning the image displayed on the screen into areas, wherein the delimitation line includes a first delimitation line which extends in horizontal direction from right edge of the image to left edge of the image and/or a second delimitation line which extends in vertical direction from top edge of the image to bottom edge of the image;

an operation unit configured to set the first delimitation line to an arbitrary position in vertical direction or set the second delimitation line to an arbitrary position in horizontal direction in the image displayed on the screen according to user operation;

a partitioning unit configured to partition the image displayed in the screen into a plurality of rectangular areas based on the position of the first and/or second delimitation lines set by said operation unit;

a rewriting unit configured to rewrite coordinates of diagonal of each rectangular area partitioned by said partitioning unit so that aspect ratio of each rectangular area corresponds to aspect ratio of the display screen;

an identifying unit configured to identify each rectangular area of the image partitioned by said partitioning unit and rewritten by said rewriting unit; and a renewal designating unit configured to renewal-designate designating information for designating the each rectangular area identified by said identifying unit according to user operation, wherein the each rectangular area, which has been designated by the designating information, is enlarged and displayed in accordance with enlargement ratio of the size of each rectangular area to the size of the screen.

2. The apparatus according to claim 1, wherein when the designating information is renewal-designated according to user operation, the each rectangular area identified by said identifying unit is designated in the order of identification number of the each rectangular area, and the entirety of the image displayed on the screen is designated after last rectangular area ends are designated.

3. The apparatus according to claim 1, wherein the screen comprises a touch panel, and the renewal designating unit renewal-designates the designating information based on identification number of the rectangular area designated on the touch panel.

4. An information processing method capable of displaying any area, which has been designated in an image displayed on a screen, upon enlarging the area, comprising:
   a display step of displaying delimitation line to be used for partitioning the image displayed on the screen into areas, wherein the delimitation line includes first delimitation line which extends in horizontal direction from right edge of the image to left edge of the image and/or second delimitation line which extends in vertical direction from top edge of the image to bottom edge of the image;
   an operating step of setting the first delimitation line to an arbitrary position in vertical direction or setting the second delimitation line to an arbitrary position in horizontal direction in the image displayed on the screen according to user operation;
   a partitioning step of partitioning the image displayed in the screen into a plurality of rectangular areas based on the position of the first and/or second delimitation lines set in said operating step;
   a rewriting step of rewriting coordinates of diagonal of each rectangular areas partitioned in said partitioning step so that aspect ratio of each rectangular area corresponds to aspect ratio of the display screen;
   an identifying step of identifying each rectangular area of the image partitioned in said partitioning step and rewritten in said rewriting step; and
   a renewal-designating step of renewal-designating designating information for designating the each rectangular area identified in said identifying step according to user operation;
   wherein the each rectangular area, which has been designated by the designating information, is enlarged and displayed in accordance with enlargement ratio of the size of the each rectangular area the size of the screen.

5. A storage medium storing a control program for causing the information processing method set forth in claim 4 to be implemented by a computer.

* * * * *